United States Patent
(12) United States Patent
Boyd

(10) Patent No.: US 12,729,968 B2
(45) Date of Patent: Sep. 8, 2026

(54) SYSTEM AND METHOD FOR ADAPTIVE NAVIGATION IN A FACILITY

(71) Applicant: Lucas C Boyd, Muscle Shoals, AL (US)

(72) Inventor: Lucas C Boyd, Muscle Shoals, AL (US)

( * ) Notice: Subject to any disclaimer, the term of this patent is extended or adjusted under 35 U.S.C. 154(b) by 15 days.

(21) Appl. No.: 19/046,746

(22) Filed: Feb. 6, 2025

(65) Prior Publication Data

US 2026/0118130 A1 Apr. 30, 2026

Related U.S. Application Data

(60) Provisional application No. 63/711,982, filed on Oct. 25, 2024.

(51) Int. Cl.

| | |
|---|---|
| ***G01C 21/34*** | (2006.01) |
| ***G01C 21/20*** | (2006.01) |
| ***G01C 21/36*** | (2006.01) |
| ***G08B 7/06*** | (2006.01) |
| ***H04W 4/029*** | (2018.01) |
| ***H04W 4/33*** | (2018.01) |
| ***H04W 4/90*** | (2018.01) |

(52) U.S. Cl.

CPC ....... *G01C 21/3461* (2013.01); *G01C 21/206* (2013.01); *G01C 21/3617* (2013.01); *G01C 21/3632* (2013.01); *G01C 21/3682* (2013.01); *G08B 7/066* (2013.01); *H04W 4/029* (2018.02); *H04W 4/33* (2018.02); *H04W 4/90* (2018.02)

(58) Field of Classification Search

CPC .............. G01C 21/3461; G01C 21/206; G01C 21/3617; G01C 21/3632; G01C 21/3682; H04W 4/33; H04W 4/029; H04W 4/90; G08B 7/066

See application file for complete search history.

(56) References Cited

U.S. PATENT DOCUMENTS 6,424,912 B1 * 7/2002 Correia .............. G01C 21/3626 701/428
10,233,021 B1 * 3/2019 Brady ................ G01C 21/3697
2009/0043486 A1 * 2/2009 Yang .................. G01C 21/3492 701/117
2011/0106426 A1 * 5/2011 Tertoolen ......... G08G 1/096861 701/533
2019/0376798 A1 * 12/2019 Abramson ......... G01C 21/3641
2019/0392545 A1 * 12/2019 Wei ........................ G06Q 90/20
2020/0191595 A1 * 6/2020 Chipouras .......... G01C 21/3655
2024/0361137 A1 * 10/2024 Aviv .................. G01C 21/3469

* cited by examiner

*Primary Examiner* — Gertrude Arthur Jeanglaude

(74) *Attorney, Agent, or Firm* — AdamsIP, LLC

(57) ABSTRACT

The present disclosure provides a navigation system comprising a first computing device with a user interface for providing navigation within a facility. The system includes a GPS device and a second computing device operably connected to the first computing device. A processor receives geospatial data from the GPS device and directs a user to the facility via a first geographic information system (GIS) based on the facility's geolocation. The system receives facility navigation instructions when the user is within a threshold distance of the facility, opens a second GIS, and directs the user to an entry location and final location using the second GIS and facility navigation instructions. The system can also receive and transmit emergency user data, receive emergency facility navigation instructions, and direct the user to a new final location based on emergency conditions.

20 Claims, 16 Drawing Sheets

| COMPLAINT LIST | PAID/IN USE | POINT OF CONTACT |
|---|---|---|
| XYZ | ✓ | JOHN SMITH |
| YXZ | ✓ | ASHLEY JONES |
| XXX | X | JAMES |
| XXX | X | DONALD |
| | X | ANTHONY |

FIG. 5

"USER LIST" PAGE

PINTAIL LOGO

ADMIN USER LIST

HOME
USER LIST
CURRENT MAP
USER COMPLIANCE
SUPPORT

SEARCH

| COMPANY | ACTIVE USERS | LOCATION(S) |
|---|---|---|
| XYZ | 368 | MUS,AL |
| YXZ | 200 | MUS,AL |
| YXZ | 168 | MUS,AL |
| YXZ | 415 | MUS,AL |
| YXZ | 565 | MUS,AL |
| YXZ | 556 | MUS,AL |

COMPANY USER PAGE

PINTAIL LOGO

COMPANY USER LIST

HOME
USER LIST
CURRENT MAP
USER COMPLIANCE
SUPPORT

SEARCH

| COMPANY XYZ | | |
|---|---|---|
| NAME | TIME | LOCATION(S) |
| JON JAMES | 7:15AM | MUS,AL |
| BILLY RAY | 9:15AM | MUS,AL |
| JAMES | 10:15AM | MUS,AL |
| DONALD | 5:12PM | MUS,AL |
| ANTHONY | 8:20PM | MUS,AL |
| JOHN SMITH | 9:35PM | MUS,AL |

CURRENT MAP

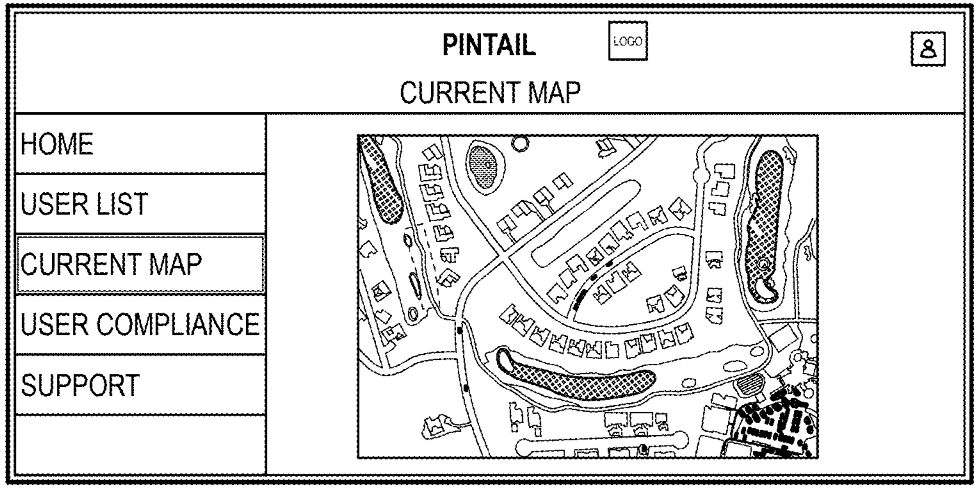

FIG. 6

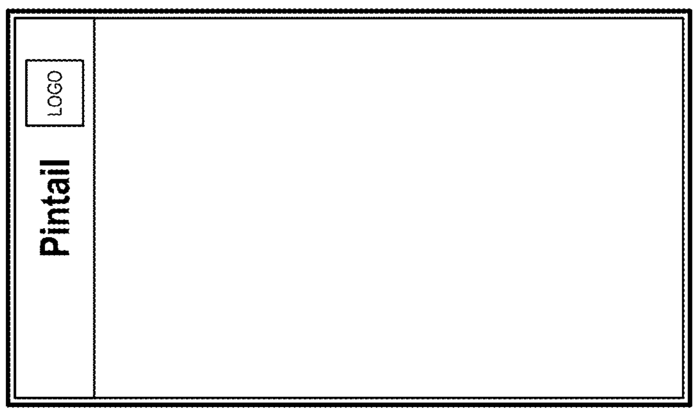
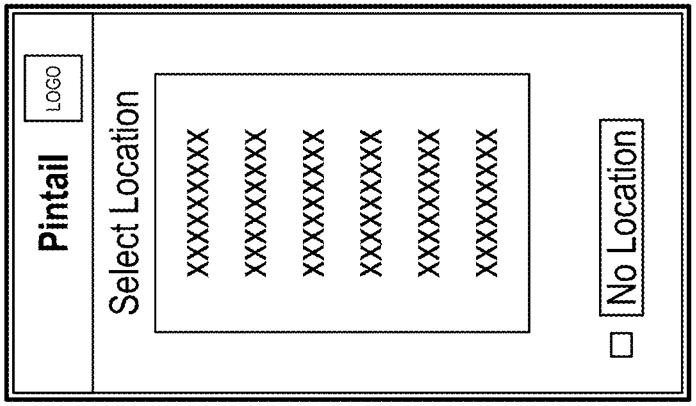
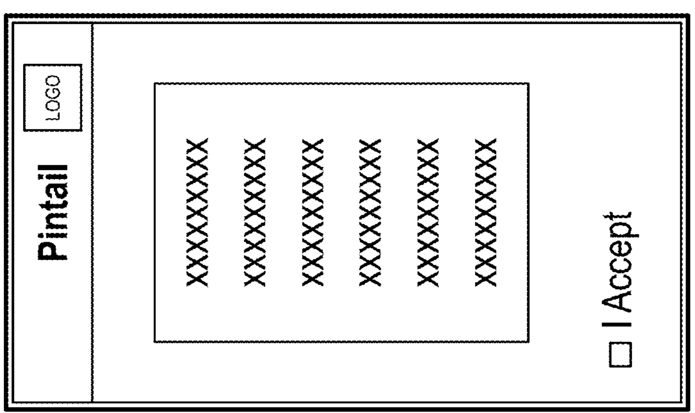
FIG. 7

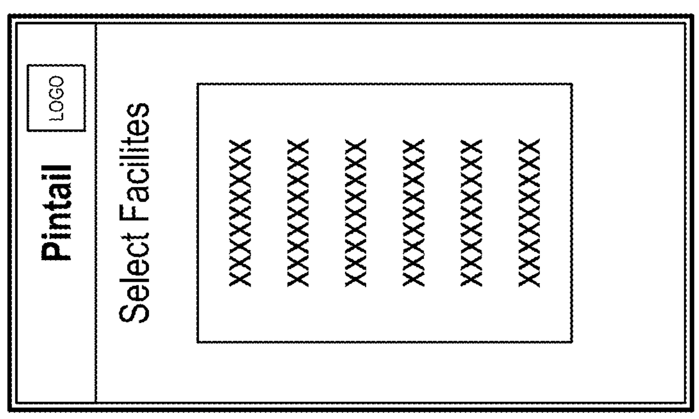
Pintail
LOGO
User Name:
Password:
FIG. 8
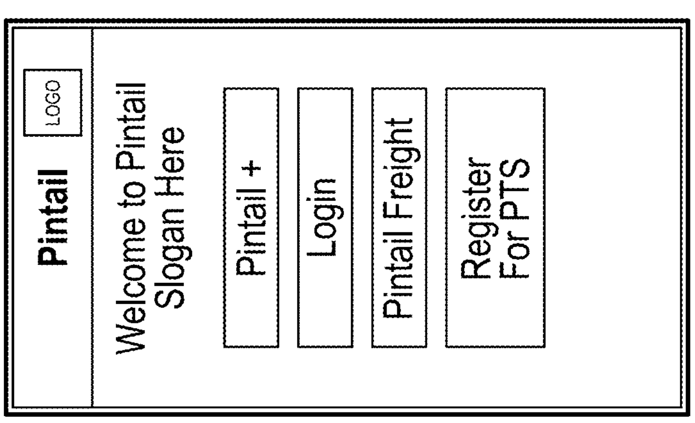

PINTAIL FREIGHT LOGO

HOME
ACCOUNT STATUS
ADD USERS
SUPPORT

FREIGHT COMPANY

ACCOUNT STATUS: ACTIVE
USER :123

ACCOUNT STATUS

PINTAIL FREIGHT LOGO

HOME
ACCOUNT STATUS
ADD USERS
SUPPORT

FREIGHT COMPANY

| DRIVER | ACCOUNT STATUS |
|---|---|
| TIMMY JOE | ACTIVE |
| XXXXXX | XXXXXX |
| XXXXXX | XXXXXX |

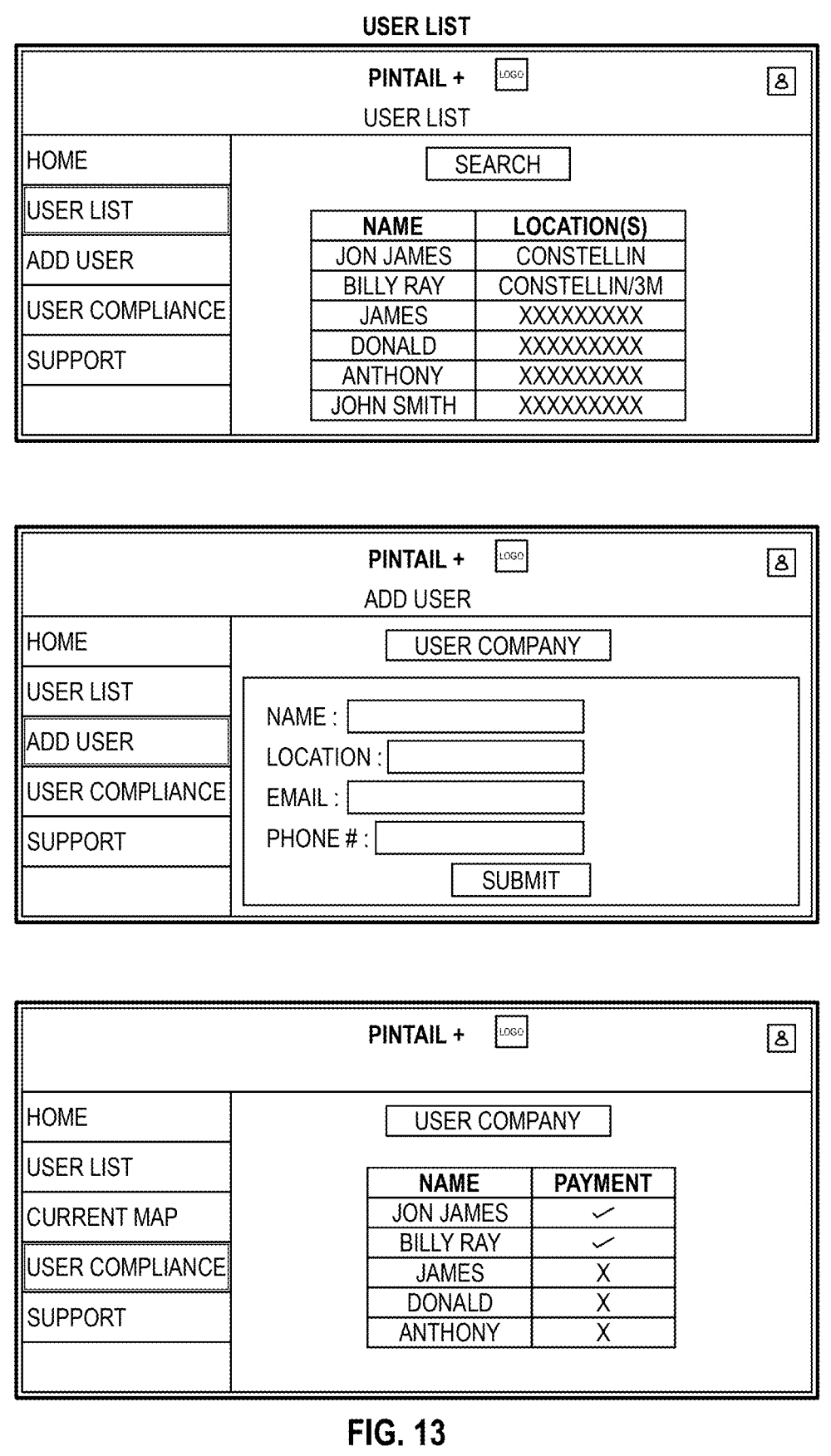

| NAME | LOCATION(S) |
|---|---|
| JON JAMES | CONSTELLIN |
| BILLY RAY | CONSTELLIN/3M |
| JAMES | XXXXXXXXX |
| DONALD | XXXXXXXXX |
| ANTHONY | XXXXXXXXX |
| JOHN SMITH | XXXXXXXXX |

| NAME | PAYMENT |
|---|---|
| JON JAMES | ✓ |
| BILLY RAY | ✓ |
| JAMES | X |
| DONALD | X |
| ANTHONY | X |

FIG. 13

PINTAIL ADMIN HOME PAGE

PINTAIL + LOGO

FACILITY ADMIN HERE

HOME

USER LIST

ADD COMPANY

CURRENT MAP

USER COMPANY COMPLIANCE

FACILITY SITE NAME HERE

PINTAIL + HOME PAGE

PINTAIL + LOGO

PINTAIL + HOME

HOME

USERS

ADD / REMOVE USERS

COMPLIMENT PAYEMENT

COMPANY USER NAME

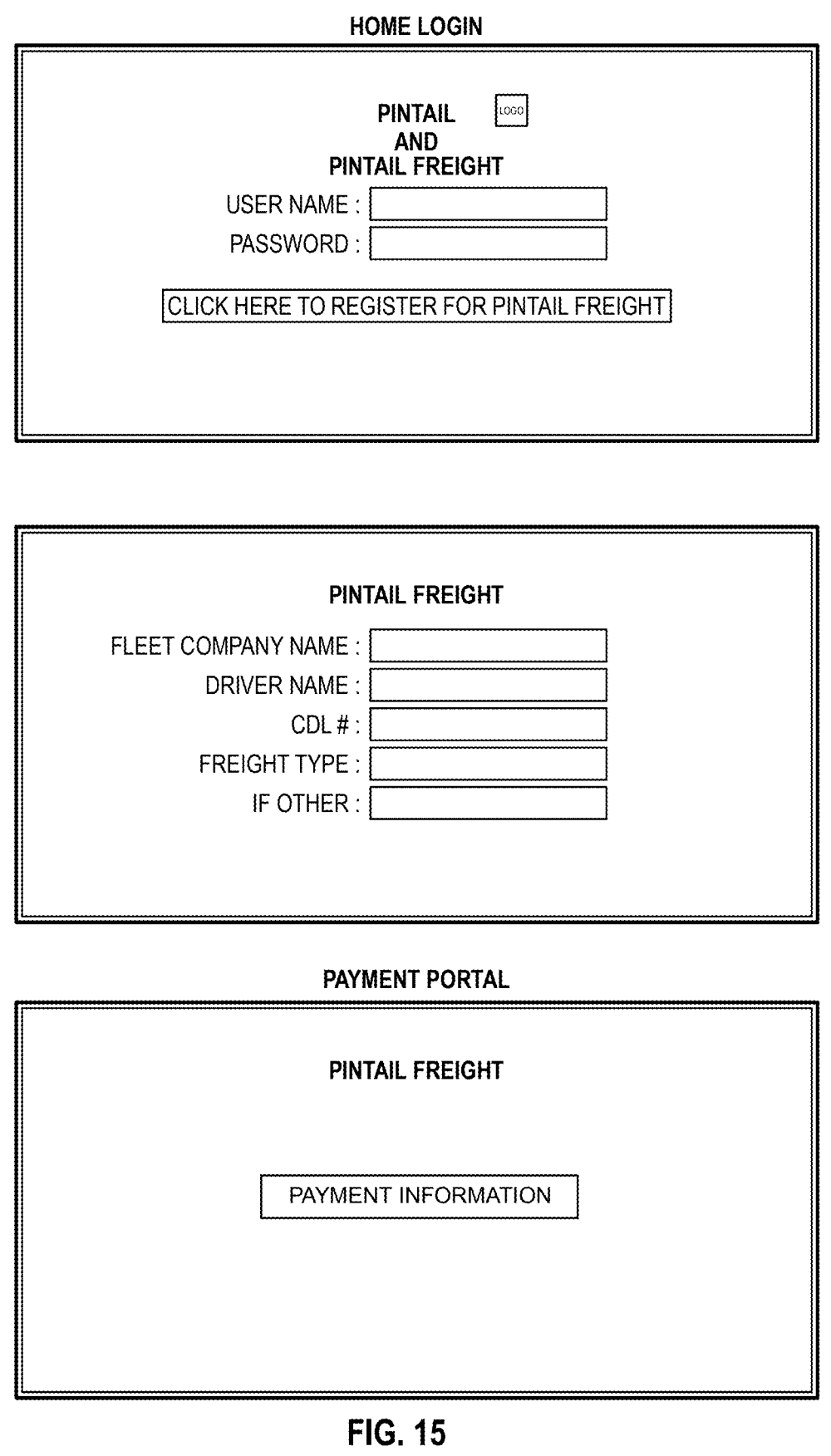

HOME LOGIN

PINTAIL
AND
PINTAIL FREIGHT

LOGO

USER NAME :

PASSWORD :

CLICK HERE TO REGISTER FOR PINTAIL FREIGHT

PINTAIL FREIGHT

FLEET COMPANY NAME :

DRIVER NAME :

CDL # :

FREIGHT TYPE :

IF OTHER :

PAYMENT PORTAL

PINTAIL FREIGHT

PAYMENT INFORMATION

FIG. 15

SYSTEM AND METHOD FOR ADAPTIVE NAVIGATION IN A FACILITY

CROSS REFERENCES

This application claims priority to U.S. Provisional Application Ser. No. 63/711,982, filed on Oct. 25, 2024, wherein said application is incorporated herein in its entirety by reference.

FIELD OF INVENTION

The present disclosure relates to navigation systems, and more particularly to an adaptive navigation system for guiding users within facilities using multiple geographic information systems and real-time data.

BACKGROUND

Navigation systems have become increasingly prevalent in modern society, providing users with directions and guidance to reach desired destinations. These systems typically rely on global positioning system (GPS) technology to determine a user's location and provide turn-by-turn directions to a specified endpoint. While traditional GPS systems have proven effective for outdoor navigation, they often fall short when it comes to guiding users within large, complex facilities such as hospitals, airports, shopping malls, or industrial plants. Additionally, traditional GPS systems have failed to provide accurate directions to specific areas of complex facilities for drivers of vehicles, making the delivery and retrieval of goods less efficient than it otherwise might be. Further, traditional navigation systems are not equipped to direct users away from emergency situations that might develop at complex facilities, resulting in users possibly being directed into further harm and/or unintentionally interfering with emergency personnel.

The limitations of conventional navigation systems in indoor and complex environments have led to increased demand for more sophisticated solutions that may seamlessly transition between outdoor and indoor navigation while adapting to the unique challenges posed by different types of facilities. These challenges may include signal interference from building structures, the need for more detailed and context-aware instructions, and the incorporation of real-time data to optimize routing. As facilities become increasingly complex and user expectations for seamless navigation continue to rise, there is a clear opportunity for improved navigation systems that may address the unique challenges of indoor environments while integrating smoothly with existing outdoor navigation technologies.

Accordingly, there is a need in the art for a system and method configured to direct users to specific areas of complex facilities based on user data as well as safely direct users away from emergency situations that may develop within a complex facility.

SUMMARY

A system and method for directing users within a facility based on user data is provided, wherein the facility is a complex facility having a plurality of areas that a user may be directed to, based on the purpose of the user's visit. The second computing device may be a server located remotely from the first computing device. In one aspect, the system directs a user to a specific location within a facility using multiple global information systems and user data. In another aspect, the system uses security methods to determine if a user has permissions to use a GIS specific to the facility. In yet another aspect, the system creates emergency directions for users located at a facility when it is determined that the facility is currently under an emergency situation. Generally, the system and methods of the present disclosure are designed to guide users around a complex facility.

The system generally comprises a first computing device having a user interface, GPS device operably connected to the first computing device, second computing device operably connected to the first computing device, processor operably connected to the first computing device, second computing device, and GPS device, and non-transitory computer-readable medium coupled to said processor and having instructions stored thereon. In one preferred embodiment, a database may be operably connected to the processor and the various data of the system may be stored therein, including, but not limited to, user data, facility data, and emergency data. In yet another preferred embodiment, a wireless communication interface may allow the processors of the system to receive and transmit the various data of the system therebetween.

The first computing device is configured to receive facility instructions having an entry location for the facility, which are preferably transmitted to the first computing device when the user is within a threshold distance of the facility. A first GIS of the user interface directs the user to the facility, and a second GIS of the user interface directs the user to an entry location and final location about the facility. Some preferred embodiments may direct a user to an exit location, which may or may not be the same as the entry location. The first GIS and the second GIS may be different geographic information systems optimized for long-range navigation and short-range navigation, respectively. The second GIS comprises a map of the facility with the entry location and final location highlighted.

The GPS device is configured to receive geospatial data pertaining to a location of the first computing device, and the second computing device is configured to send the facility navigation instructions to the first computing device when the user is within the threshold distance of the facility as determined by the geolocation of the facility and the geospatial data gathered by the GPS device. The threshold distance may be dynamically adjusted based on factors including at least one of traffic conditions, time of day, or weather conditions. The second computing device creates the facility navigation instructions, including an entrance location, final location, and exit location, and sends them to the first computing device. The facility navigation instructions are preferably based on user data used to determine the purpose of the user's visit to the facility. The user data used to determine the facility navigation instructions may comprise at least one of user preferences, user history, user appointments, or user medical information. In some embodiments, the second computing device may create emergency facility navigation instructions based on an emergency taking place at the facility, wherein the emergency facility navigation instructions are configured to direct non-emergency personnel away from the emergency and emergency personnel towards the emergency. The emergency facility navigation instructions may be such that the emergency personnel and non-emergency personnel are instructed to take routes that do not use the same pathways about the facility, including hallways and roads.

According to another aspect of the present disclosure, a method for providing navigation within a facility is provided. The method includes receiving, by a first computing device, an entry location for the facility when a user is within a threshold distance of the facility. The method includes directing, via a first geographic information system (GIS) of a user interface of the first computing device, the user to the entry location of the facility. The method includes receiving, by the first computing device, facility navigation instructions when the user is within a threshold distance of the entry location, wherein the facility navigation instructions comprise a final location determined based on user data. The method includes directing, via a second GIS of the user interface, the user to the final location. The method includes receiving, by a GPS device operably connected to the first computing device, geospatial data pertaining to a location of the first computing device. The method includes sending, by a second computing device operably connected to the first computing device, the facility navigation instructions to the first computing device when the user is within the threshold distance of the facility.

The method includes analyzing, by the second computing device, the user data to determine the final location. The method includes receiving, by a processor operably connected to the first computing device, second computing device, and GPS device, the geospatial data from the GPS device. The method includes directing, by the processor, the user to the facility via the first GIS based on a geolocation of the facility. The method includes receiving, by the processor, the facility navigation instructions when the user is within the threshold distance of the facility. The method includes opening, by the processor, the second GIS of the user interface when the facility navigation instructions are received. The method includes directing, by the processor, the user to the entry location of the facility using the second GIS and the facility navigation instructions. The method includes directing, by the processor, the user to the final location of the facility using the second GIS and the facility navigation instructions.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they may readily utilize these features for designing or modifying other systems for carrying out the same purpose of the system and method disclosed herein. Those skilled in the pertinent art should also realize that such equivalent designs or modifications do not depart from the scope of the system and method of the present disclosure.

BRIEF DESCRIPTION OF FIGURES

These and other features, aspects, and advantages of the present disclosure will become better understood with regard to the following description, appended claims, and accompanying drawings where:

Figure 5:
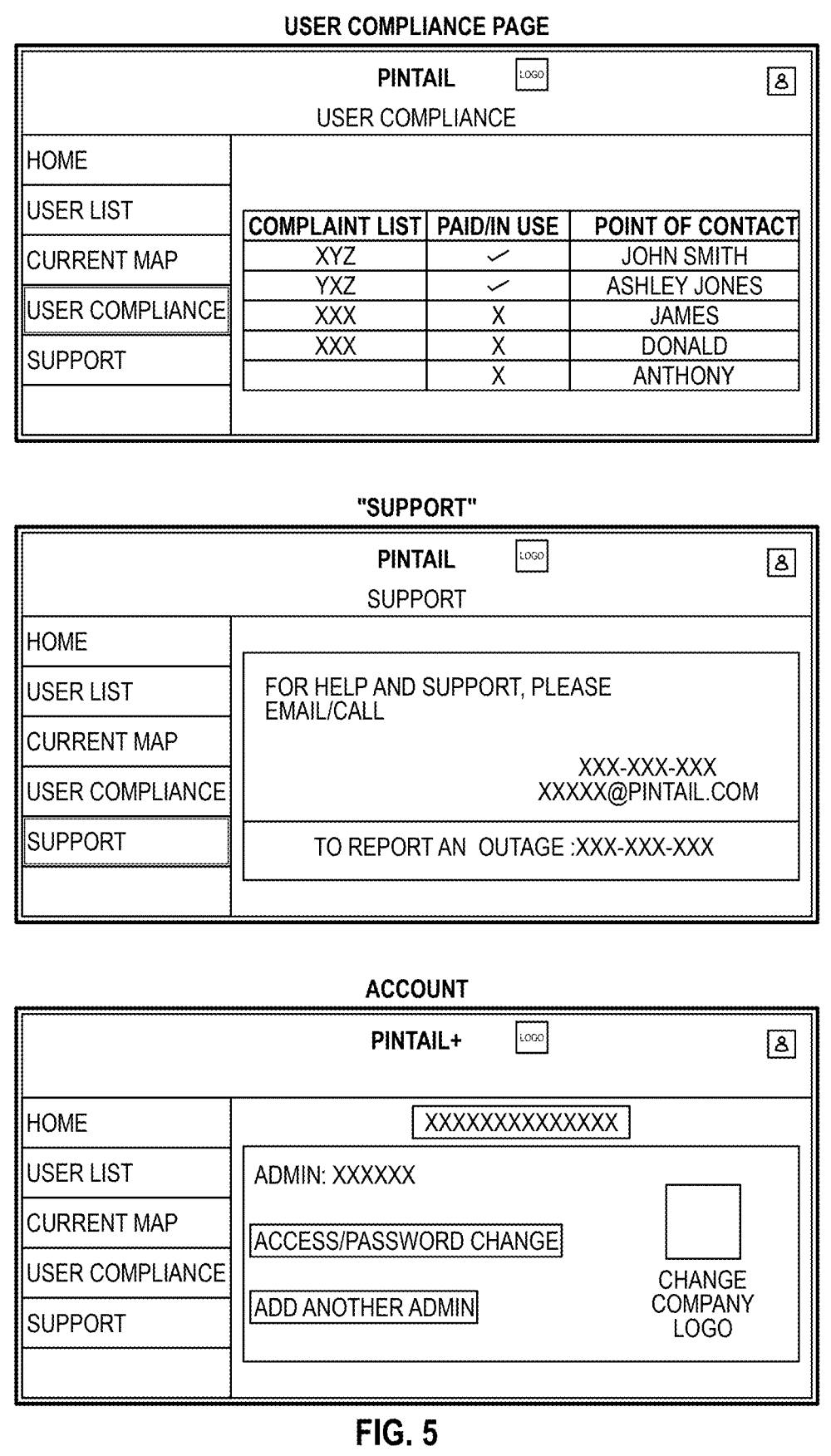

FIG. 5 illustrates a system diagram of an administrative interface for a navigation application, according to an embodiment.

FIG. 6 illustrates a system diagram for an administrative interface of a navigation application, according to an embodiment.

FIG. 7 illustrates a system diagram of a navigation application for industrial facilities, according to aspects of the present disclosure.

FIG. 8 illustrates a user interface flow diagram for a mobile application, according to an embodiment.

FIG. 9 illustrates a system diagram for a freight management application, according to aspects of the present disclosure.

Figure 11:
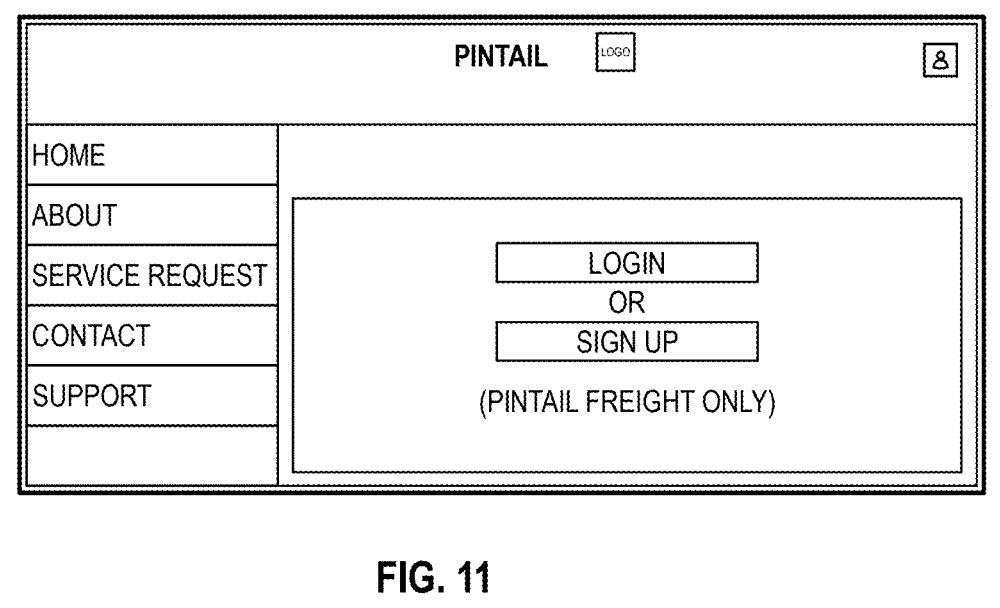

FIG. 11 illustrates a block diagram of a navigation system for use within facilities, according to aspects of the present disclosure.

Figure 12:
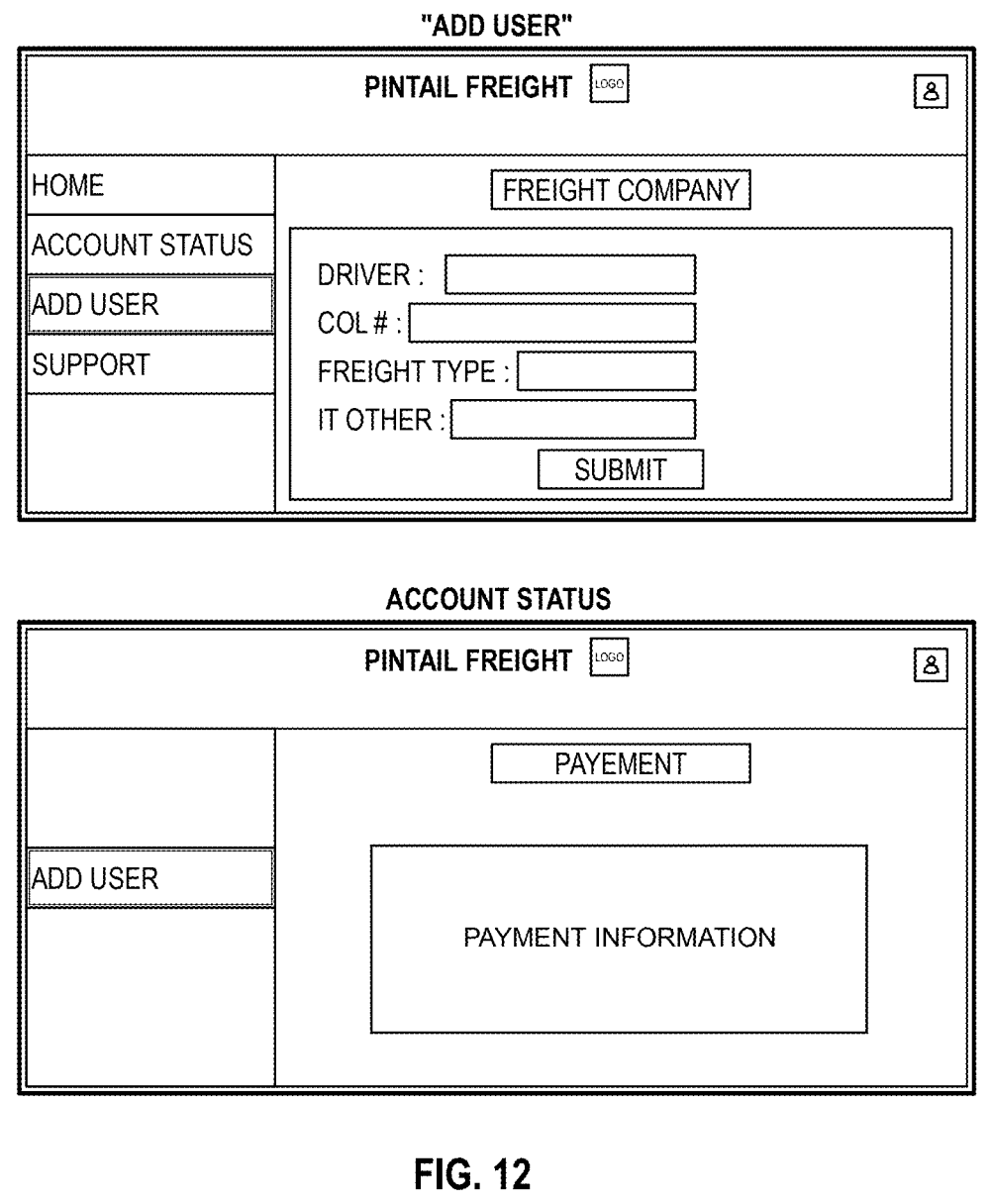

FIG. 12 illustrates a system diagram for a user interface of a freight management application, according to an embodiment.

FIG. 13 illustrates a user interface system for a navigation application, according to aspects of the present disclosure.

FIG. 15 illustrates a system diagram of a website interface for a navigation system, according to aspects of the present disclosure.

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature may also be used, to the extent possible, in combination with/or in the context of other particular aspects of the embodiments of the invention, and in the invention generally.

The term "comprises", and grammatical equivalents thereof are used herein to mean that other components, steps, etc. are optionally present. For instance, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). As will be evident from the disclosure provided below, the present invention satisfies the need for a system and method for directing users within a facility based on user data.

Figure 1:
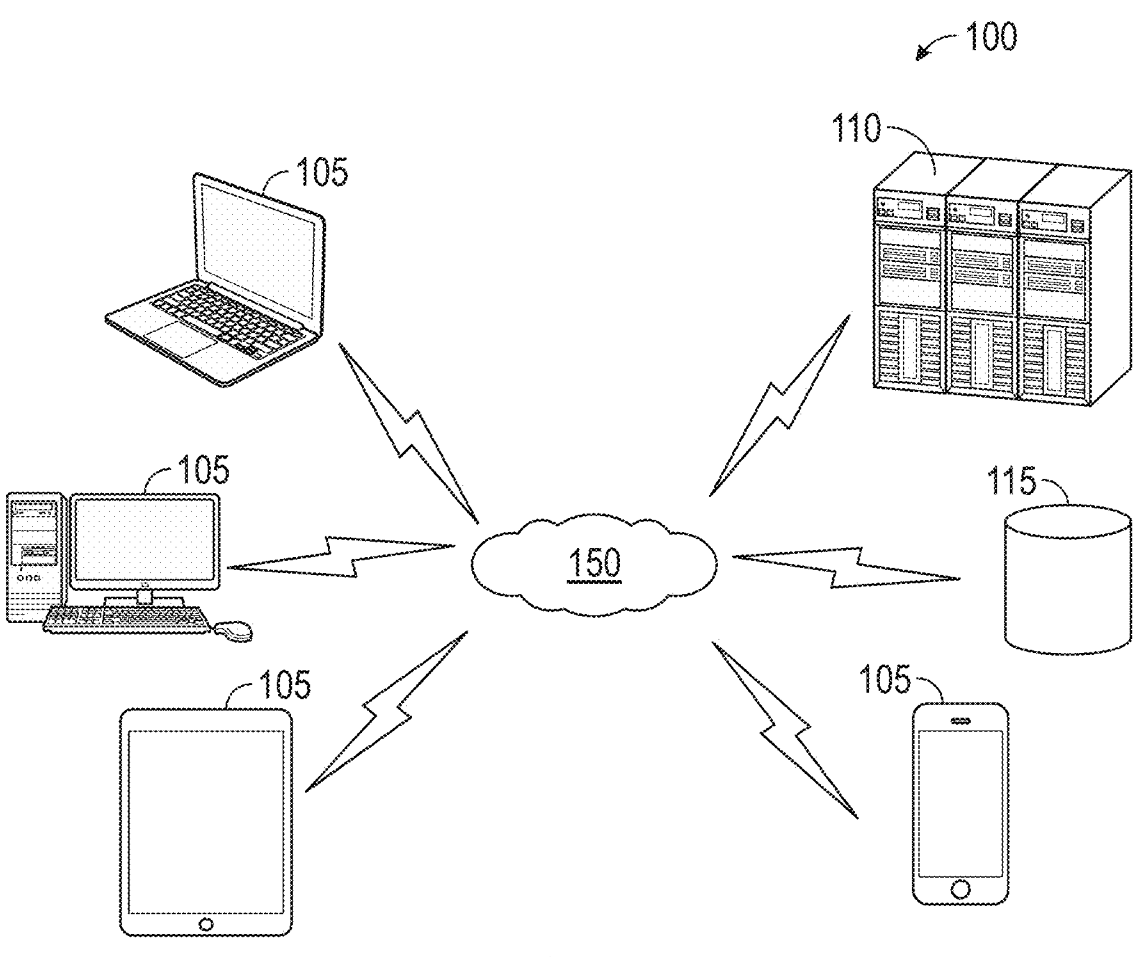
FIG. 1 illustrates a system embodying features consistent with the principles of the present disclosure.

FIG. 1 depicts an exemplary environment 100 of the system 400 consisting of clients 105 connected to a server 110 and/or database 115 via a network 150. Clients 105 are devices of users 405 that may be used to access servers 110 and/or databases 115 through a network 150. A network 150 may comprise of one or more networks of any kind, including, but not limited to, a local area network (LAN), a wide area network (WAN), metropolitan area networks (MAN), a telephone network, such as the Public Switched Telephone Network (PSTN), an intranet, the Internet, a memory device, another type of network, or a combination of networks. In a preferred embodiment, computing entities 200 may act as clients 105 for a user 405. For instance, a client 105 may include a personal computer, a wireless telephone, a streaming device, a "smart" television, a personal digital assistant (PDA), a laptop, a smart phone, a tablet computer, or another type of computation or communication interface 280. Servers 110 may include devices that access, fetch, aggregate, process, search, provide, and/or maintain documents. Although FIG. 1 depicts a preferred embodiment of an environment 100 for the system 400, in other implementations, the environment 100 may contain fewer components, different components, differently arranged components, and/or additional components than those depicted in FIG. 1. Alternatively, or additionally, one or more components of the environment 100 may perform one or more other tasks described as being performed by one or more other components of the environment 100.

As depicted in FIG. 1, one embodiment of the system 400 may comprise a server 110. Although shown as a single server 110 in FIG. 1, a server 110 may, in some implementations, be implemented as multiple devices interlinked together via the network 150, wherein the devices may be distributed over a large geographic area and performing different functions or similar functions. For instance, two or more servers 110 may be implemented to work as a single server 110 performing the same tasks. Alternatively, one server 110 may perform the functions of multiple servers 110. For instance, a single server 110 may perform the tasks of a web server and an indexing server 110. Additionally, it is understood that multiple servers 110 may be used to operably connect the processor 220 to the database 115 and/or other content repositories. The processor 220 may be operably connected to the server 110 via wired or wireless connection. Types of servers 110 that may be used by the system 400 include, but are not limited to, search servers, document indexing servers, and web servers, or any combination thereof.

Search servers may include one or more computing entities 200 designed to implement a search engine, such as a documents/records search engine, general webpage search engine, etc. Search servers may, for instance, include one or more web servers designed to receive search queries and/or inputs from users 405, search one or more databases 115 in response to the search queries and/or inputs, and provide documents or information, relevant to the search queries and/or inputs, to users 405. In some implementations, search servers may include a web search server that may provide webpages to users 405, wherein a provided webpage may include a reference to a web server at which the desired information and/or links are located. The references to the web server at which the desired information is located may be included in a frame and/or text box, or as a link to the desired information/document. Document indexing servers may include one or more devices designed to index documents available through networks 150. Document indexing servers may access other servers 110, such as web servers that host content, to index the content. In some implementations, document indexing servers may index documents/records stored by other servers 110 connected to the network 150. Document indexing servers may, for instance, store and index content, information, and documents relating to user accounts and user-generated content. Web servers may include servers 110 that provide webpages to clients 105. For instance, the webpages may be HTML-based webpages. A web server may host one or more websites. As used herein, a website may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

As used herein, a database 115 refers to a set of related data and the way it is organized. Access to this data is usually provided by a database management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

Figure 2:
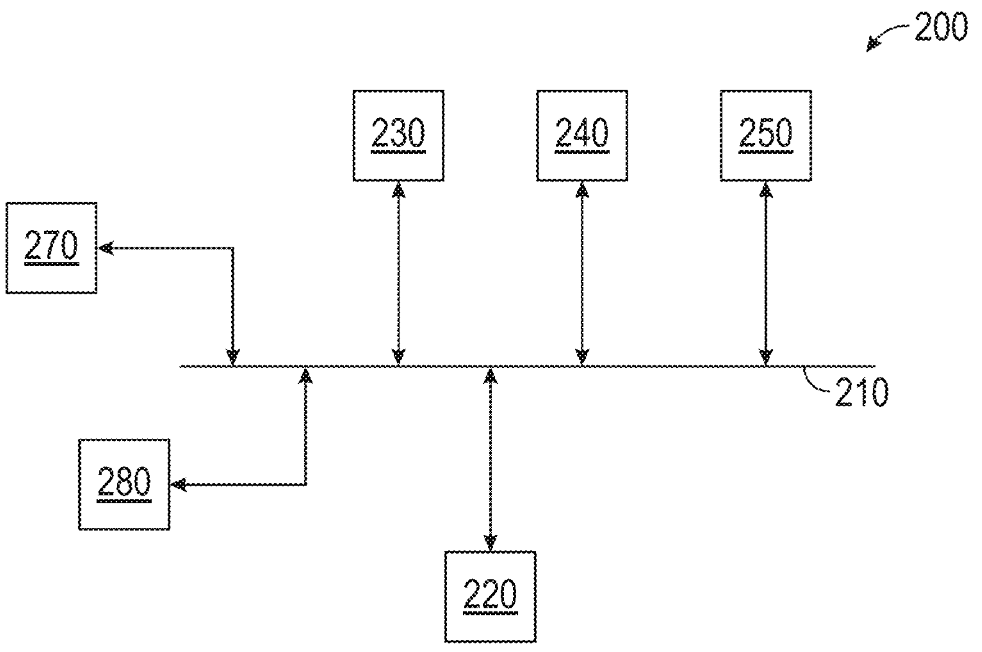
FIG. 2 illustrates a system embodying features consistent with the principles of the present disclosure.

FIG. 2 is an exemplary diagram of a client 105, server 110, and/or or database 115 (hereinafter collectively referred to as "computing entity 200"), which may correspond to one or more of the clients 105, servers 110, and databases 115 according to an implementation consistent with the principles of the invention as described herein. The computing entity 200 may comprise a bus 210, a processor 220, memory 304, a storage device 250, a peripheral device 270, and a communication interface 280 (such as wired or wireless communication device). The bus 210 may be defined as one or more conductors that permit communication among the components of the computing entity 200. The processor 220 may be defined as logic circuitry that responds to and processes the basic instructions that drive the computing entity 200. Memory 304 may be defined as the integrated circuitry that stores information for immediate use in a computing entity 200. A peripheral device 270 may be defined as any hardware used by a user 405 and/or the computing entity 200 to facilitate communicate between the two. A storage device 250 may be defined as a device used to provide mass storage to a computing entity 200. A communication interface 280 may be defined as any transceiver-like device that enables the computing entity 200 to communicate with other devices and/or computing entities 200. Types of devices that may act as the transmitter include, but are not limited, to near field communication (NFC), Bluetooth, infrared (IR), radio-frequency communication (RFC), radio-frequency identification (RFID), and ANT+, or any combination thereof. In an embodiment, transmitters may broadcast signals of more than one type.

The bus 210 may comprise a high-speed interface 308 and/or a low-speed interface 312 that connects the various components together in a way such they may communicate with one another. A high-speed interface 308 manages bandwidth-intensive operations for computing device 300, while a low-speed interface 312 manages lower bandwidth-intensive operations. In some preferred embodiments, the high-speed interface 308 of a bus 210 may be coupled to the memory 304, display 316, and to high-speed expansion ports 310, which may accept various expansion cards such as a graphics processing unit (GPU). In other preferred embodiments, the low-speed interface 312 of a bus 210 may be coupled to a storage device 250 and low-speed expansion ports 314. The low-speed expansion ports 314 may include various communication ports, such as USB, Bluetooth, Ethernet, wireless Ethernet, etc. Additionally, the low-speed expansion ports 314 may be coupled to one or more peripheral devices 270, such as a keyboard, pointing device, scanner, and/or a networking device, wherein the low-speed expansion ports 314 facilitate the transfer of input data from the peripheral devices 270 to the processor 220 via the low-speed interface 312.

The processor 220 may comprise any type of conventional processor or microprocessor that interprets and executes computer readable instructions. The processor 220 is configured to perform the operations disclosed herein based on instructions stored within the system 400. The processor 220 may process instructions for execution within the computing entity 200, including instructions stored in memory 304 or on a storage device 250, to display graphical information for a graphical user interface (GUI) on an external peripheral device 270, such as a display 316. The processor 220 may provide for coordination of the other components of a computing entity 200, such as control of user interfaces 411, applications run by a computing entity 200, and wireless communication by a communication interface 280 of the computing entity 200. The processor 220 may be any processor or microprocessor suitable for executing instructions. In some embodiments, the processor 220 may have a memory device therein or coupled thereto suitable for storing the data, content, or other information or material disclosed herein. In some instances, the processor 220 may be a component of a larger computing entity 200. A computing entity 200 that may house the processor 220 therein may include, but are not limited to, laptops, desktops, workstations, personal digital assistants, servers 110, mainframes, cellular telephones, tablet computers, smart televisions, streaming devices, smart watches, or any other similar device. Accordingly, the inventive subject matter disclosed herein, in full or in part, may be implemented or utilized in devices including, but are not limited to, laptops, desktops, workstations, personal digital assistants, servers 110, mainframes, cellular telephones, tablet computers, smart televisions, streaming devices, or any other similar device.

Memory 304 stores information within the computing device 300. In some preferred embodiments, memory 304 may include one or more volatile memory units. In another preferred embodiment, memory 304 may include one or more non-volatile memory units. Memory 304 may also include another form of computer-readable medium, such as a magnetic, solid state, or optical disk. For instance, a portion of a magnetic hard drive may be partitioned as a dynamic scratch space to allow for temporary storage of information that may be used by the processor 220 when faster types of memory, such as random-access memory (RAM), are in high demand. A computer-readable medium may refer to a non-transitory computer-readable memory device. A memory device may refer to storage space within a single storage device 250 or spread across multiple storage devices 250. The memory 304 may comprise main memory 230 and/or read only memory (ROM) 240. In a preferred embodiment, the main memory 230 may comprise RAM or another type of dynamic storage device 250 that stores information and instructions for execution by the processor 220. ROM 240 may comprise a conventional ROM device or another type of static storage device 250 that stores static information and instructions for use by processor 220. The storage device 250 may comprise a magnetic and/or optical recording medium and its corresponding drive.

As mentioned earlier, a peripheral device 270 is a device that facilitates communication between a user 405 and the processor 220. The peripheral device 270 may include, but is not limited to, an input device and/or an output device. As used herein, an input device may be defined as a device that allows a user 405 to input data and instructions that is then converted into a pattern of electrical signals in binary code that are comprehensible to a computing entity 200. An input device of the peripheral device 270 may include one or more conventional devices that permit a user 405 to input information into the computing entity 200, such as a controller, scanner, phone, camera, scanning device, keyboard, a mouse, a pen, voice recognition and/or biometric mechanisms, etc. As used herein, an output device may be defined as a device that translates the electronic signals received from a computing entity 200 into a form intelligible to the user 405. An output device of the peripheral device 270 may include one or more conventional devices that output information to a user 405, including a display 316, a printer, a speaker, an alarm, a projector, etc. Additionally, storage devices 250, such as CD-ROM drives, and other computing entities 200 may act as a peripheral device 270 that may act independently from the operably connected computing entity 200. For instance, a streaming device may transfer data to a smartphone, wherein the smartphone may use that data in a manner separate from the streaming device.

The storage device 250 is capable of providing the computing entity 200 mass storage. In some embodiments, the storage device 250 may comprise a computer-readable medium such as the memory 304, storage device 250, or memory 304 on the processor 220. A computer-readable medium may be defined as one or more physical or logical memory devices and/or carrier waves. Devices that may act as a computer readable medium include, but are not limited to, a hard disk device, optical disk device, tape device, flash memory or other similar solid-state memory device, or an array of devices, including devices in a storage area network or other configurations. Examples of computer-readable mediums include, but are not limited to, magnetic media such as hard disks, floppy disks, and magnetic tape; optical media such as CD ROM discs and DVDs; magneto-optical media such as optical discs; and hardware devices that are specially configured to store and perform programming instructions, such as ROM 240, RAM, flash memory, and the like.

In an embodiment, a computer program may be tangibly embodied in the storage device 250. The computer program may contain instructions that, when executed by the processor 220, performs one or more steps that comprise a method, such as those methods described herein. The instructions within a computer program may be carried to the processor 220 via the bus 210. Alternatively, the computer program may be carried to a computer-readable medium, wherein the information may then be accessed from the computer-readable medium by the processor 220 via the bus 210 as needed. In a preferred embodiment, the software instructions may be read into memory 304 from another computer-readable medium, such as data storage device 250, or from another device via the communication interface 280. Alternatively, hardwired circuitry may be used in place of or in combination with software instructions to implement processes consistent with the principles as described herein. Thus, implementations consistent with the invention as described herein are not limited to any specific combination of hardware circuitry and software.

Figure 3:
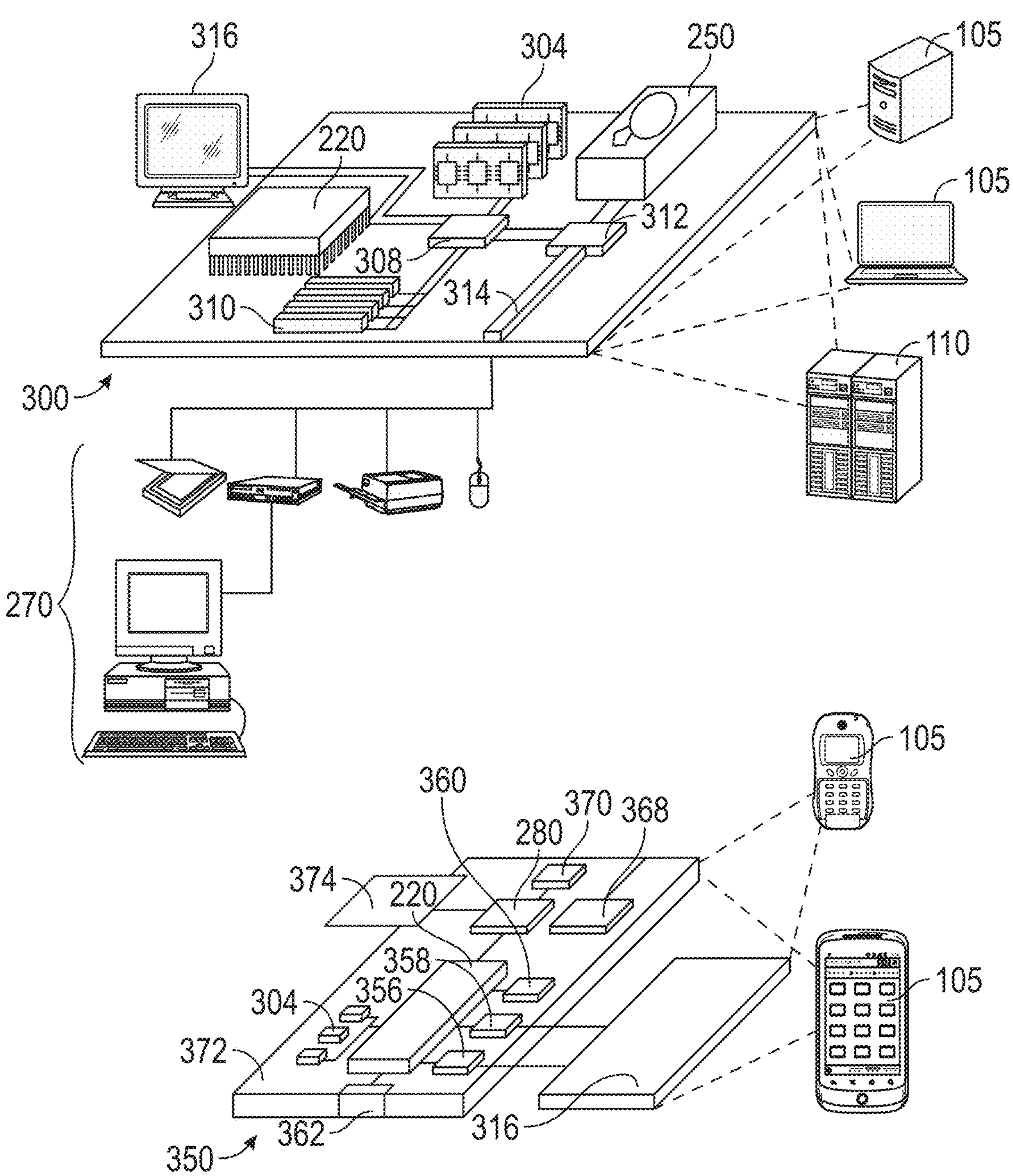
FIG. 3 illustrates a system embodying features consistent with the principles of the present disclosure.

FIG. 3 depicts exemplary computing entities 200 in the form of a computing device 300 and mobile computing device 350, which may be used to carry out the various embodiments of the invention as described herein. A computing device 300 is intended to represent various forms of digital computers, such as laptops, desktops, workstations, servers 110, databases 115, mainframes, and other appropriate computers. A mobile computing device 350 is intended to represent various forms of mobile devices, such as scanners, scanning devices, personal digital assistants, cellular telephones, smart phones, tablet computers, and other similar devices. The various components depicted in FIG. 3, as well as their connections, relationships, and functions are meant to be examples only, and are not meant to limit the implementations of the invention as described herein. The computing device 300 may be implemented in a number of different forms, as shown in FIGS. 1 and 3. For instance, a computing device 300 may be implemented as a server 110 or in a group of servers 110. Computing devices 300 may also be implemented as part of a rack server system. In addition, a computing device 300 may be implemented as a personal computer, such as a desktop computer or laptop computer. Alternatively, components from a computing device 300 may be combined with other components in a mobile device, thus creating a mobile computing device 350. Each mobile computing device 350 may contain one or more computing devices 300 and mobile devices, and an entire system may be made up of multiple computing devices 300 and mobile devices communicating with each other as depicted by the mobile computing device 350 in FIG. 3. The computing entities 200 consistent with the principles of the invention as disclosed herein may perform certain receiving, communicating, generating, output providing, correlating, and storing operations as needed to perform the various methods as described in greater detail below.

In the embodiment depicted in FIG. 3, a computing device 300 may include a processor 220, memory 304 a storage device 250, high-speed expansion ports 310, low-speed expansion ports 314, and bus 210 operably connecting the processor 220, memory 304, storage device 250, high-speed expansion ports 310, and low-speed expansion ports 314. In one preferred embodiment, the bus 210 may comprise a high-speed interface 308 connecting the processor 220 to the memory 304 and high-speed expansion ports 310 as well as a low-speed interface 312 connecting to the low-speed expansion ports 314 and the storage device 250. Because each of the components are interconnected using the bus 210, they may be mounted on a common motherboard as depicted in FIG. 3 or in other manners as appropriate. The processor 220 may process instructions for execution within the computing device 300, including instructions stored in memory 304 or on the storage device 250. Processing these instructions may cause the computing device 300 to display graphical information for a GUI on an output device, such as a display 316 coupled to the high-speed interface 308. In other implementations, multiple processors and/or multiple buses may be used, as appropriate, along with multiple memory units and/or multiple types of memory. Additionally, multiple computing devices may be connected, wherein each device provides portions of the necessary operations.

A mobile computing device 350 may include a processor 220, memory 304 a peripheral device 270 (such as a display 316, a communication interface 280, and a transceiver 368, among other components). A mobile computing device 350 may also be provided with a storage device 250, such as a micro-drive or other previously mentioned storage device 250, to provide additional storage. Preferably, each of the components of the mobile computing device 350 are interconnected using a bus 210, which may allow several of the components of the mobile computing device 350 to be mounted on a common motherboard as depicted in FIG. 3 or in other manners as appropriate. In some implementations, a computer program may be tangibly embodied in an information carrier. The computer program may contain instructions that, when executed by the processor 220, perform one or more methods, such as those described herein. The information carrier is preferably a computer-readable medium, such as memory, expansion memory 374, or memory 304 on the processor 220 such as ROM 240, that may be received via the transceiver or external interface 362. The mobile computing device 350 may be implemented in a number of different forms, as shown in FIG. 3. For instance, a mobile computing device 350 may be implemented as a cellular telephone, part of a smart phone, personal digital assistant, or other similar mobile device.

The processor 220 may execute instructions within the mobile computing device 350, including instructions stored in the memory 304 and/or storage device 250. The processor 220 may be implemented as a chipset of chips that may include separate and multiple analog and/or digital processors. The processor 220 may provide for coordination of the other components of the mobile computing device 350, such as control of the user interfaces 411, applications run by the mobile computing device 350, and wireless communication by the mobile computing device 350. The processor 220 of the mobile computing device 350 may communicate with a user 405 through the control interface 358 coupled to a peripheral device 270 and the display interface 356 coupled to a display 316. The display 316 of the mobile computing device 350 may include, but is not limited to, Liquid Crystal Display (LCD), Light Emitting Diode (LED) display, Organic Light Emitting Diode (OLED) display, and Plasma Display Panel (PDP), holographic displays, augmented reality displays, virtual reality displays, or any combination thereof. The display interface 356 may include appropriate circuitry for causing the display 316 to present graphical and other information to a user 405. The control interface 358 may receive commands from a user 405 via a peripheral device 270 and convert the commands into a computer readable signal for the processor 220. In addition, an external interface 362 may be provided in communication with processor 220, which may enable near area communication of the mobile computing device 350 with other devices. The external interface 362 may provide for wired communications in some implementations or wireless communication in other implementations. In a preferred embodiment, multiple interfaces may be used in a single mobile computing device 350 as is depicted in FIG. 3.

Memory 304 stores information within the mobile computing device 350. Devices that may act as memory 304 for the mobile computing device 350 include, but are not limited to computer-readable media, volatile memory, and non-volatile memory. Expansion memory 374 may also be provided and connected to the mobile computing device 350 through an expansion interface 372, which may include a Single In-Line Memory Module (SIM) card interface or micro secure digital (Micro-SD) card interface. Expansion memory 374 may include, but is not limited to, various types of flash memory and non-volatile random-access memory (NVRAM). Such expansion memory 374 may provide extra storage space for the mobile computing device 350. In addition, expansion memory 374 may store computer programs or other information that may be used by the mobile computing device 350. For instance, expansion memory 374 may have instructions stored thereon that, when carried out by the processor 220, cause the mobile computing device 350 perform the methods described herein. Further, expansion memory 374 may have secure information stored thereon; therefore, expansion memory 374 may be provided as a security module for a mobile computing device 350, wherein the security module may be programmed with instructions that permit secure use of a mobile computing device 350. In addition, expansion memory 374 having secure applications and secure information stored thereon may allow a user 405 to place identifying information on the expansion memory 374 via the mobile computing device 350 in a non-hackable manner.

A mobile computing device 350 may communicate wirelessly through the communication interface 280, which may include digital signal processing circuitry where necessary. The communication interface 280 may provide for communications under various modes or protocols, including, but not limited to, Global System Mobile Communication (GSM), Short Message Services (SMS), Enterprise Messaging System (EMS), Multimedia Messaging Service (MMS), Code Division Multiple Access (CDMA), Time Division Multiple Access (TDMA), Personal Digital Cellular (PDC), Wideband Code Division Multiple Access (WCDMA), IMT Multi-Carrier (CDMAX 0), and General Packet Radio Service (GPRS), or any combination thereof. Such communication may occur, for instance, through a transceiver 368. Short-range communication may occur, such as using a Bluetooth, WIFI, or other such transceiver 368. In addition, a Global Positioning System (GPS) receiver module 370 may provide additional navigation- and location-related wireless data to the mobile computing device 350, which may be used as appropriate by applications running on the mobile computing device 350. Alternatively, the mobile computing device 350 may communicate audibly using an audio codec 360, which may receive spoken information from a user 405 and covert the received spoken information into a digital form that may be processed by the processor 220. The audio codec 360 may likewise generate audible sound for a user 405, such as through a speaker, e.g., in a handset of mobile computing device 350. Such sound may include sound from voice telephone calls, recorded sound such as voice messages, music files, etc. Sound may also include sound generated by applications operating on the mobile computing device 350.

The system 400 may also comprise a power supply. The power supply may be any source of power that provides the system 400 with power. In an embodiment, the power supply may be a stationary power outlet. The system 400 may comprise of multiple power supplies that may provide power to the system 400 in different circumstances. For instance, the system 400 may be directly plugged into a stationary power outlet, which may provide power to the system 400 so long as it remains in one place. However, the system 400 may also be connected to a backup battery so that the system 400 may receive power even when the power supply is not connected to a stationary power outlet or if the stationary power outlet ceases to provide power to the computing entity 200.

Figure 4:
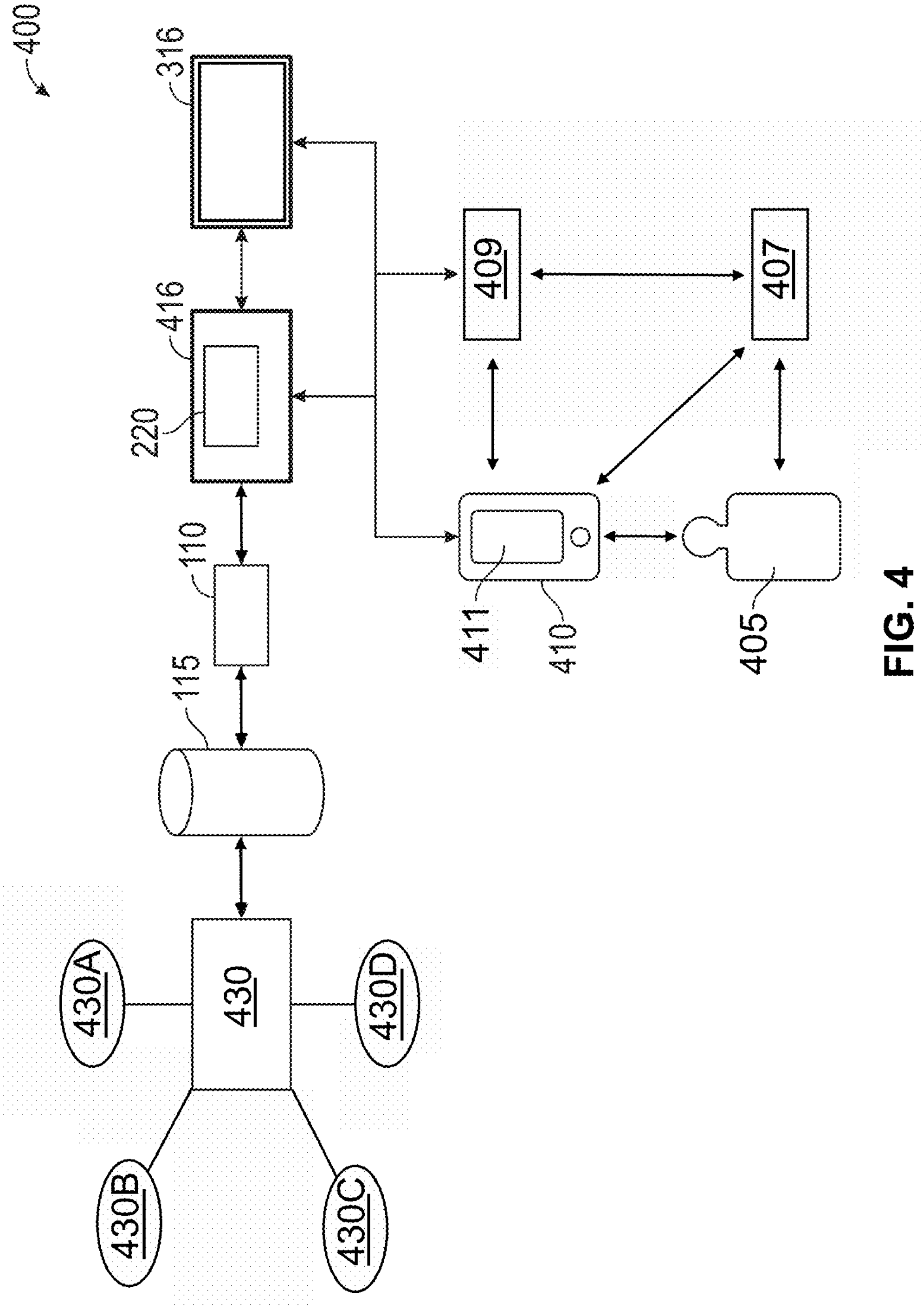
FIG. 4 illustrates a system embodying features consistent with the principles of the present disclosure.
Figure 10:
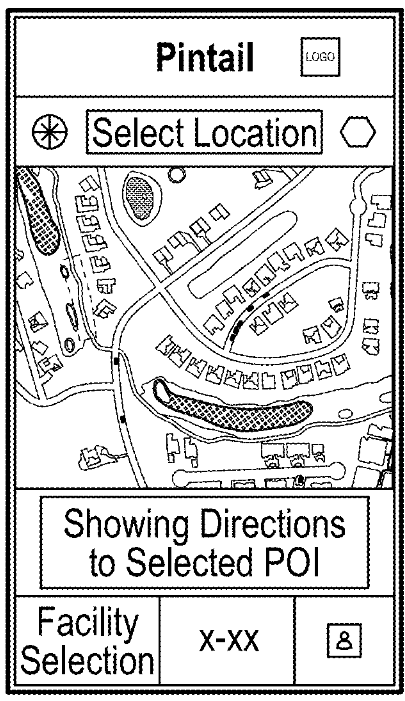
FIG. 10 illustrates a user interface design for a mobile navigation application, according to an embodiment.
Figure 14:
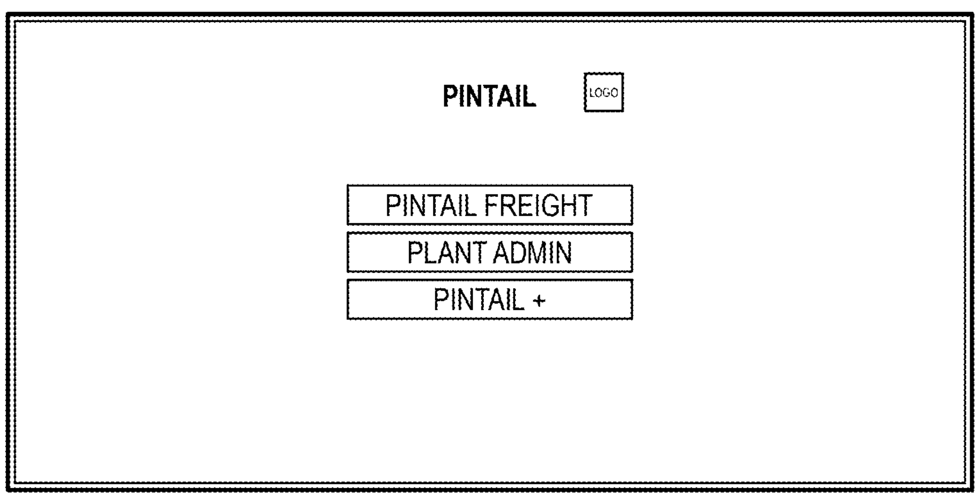
FIG. 14 illustrates a system diagram of a navigation application, according to an embodiment.
Figure 16:
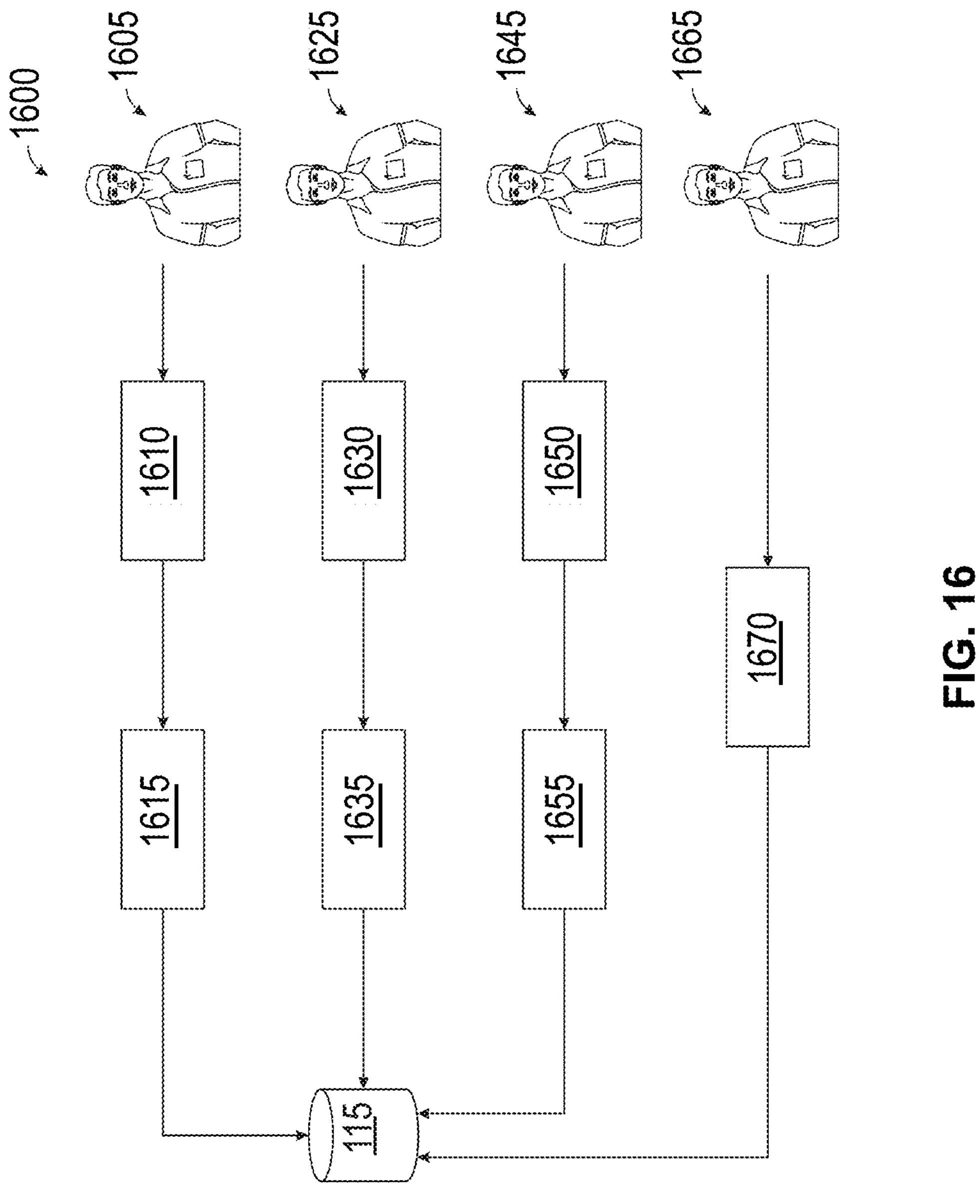
FIG. 16 is a diagram illustrating the manner in which individual access to data may be granted or limited based on user roles and administrator roles.

FIGS. 4-16 illustrate embodiments of a system 400 and methods for directing users 405 within a facility based on user data 430A. FIG. 4 illustrates a preferred embodiment of the system 400 having a first computing device 410 comprising a user interface 411, second computing device 407, GPS device 409, processor 220, and non-transitory computer-readable medium 416. FIG. 5 illustrates a user interface 411 for a navigation application of the system 400 having a User Compliance Page, Support Page, and Account Page. FIG. 6 illustrates a user interface 411 for a navigation application of the system 400 having a User List page, Company User page, and Current Map page. FIG. 7 illustrates example user interfaces 411 of the system 400. FIG. 8 illustrates how a user 405 may select facilities within the user interface 411. FIG. 9 illustrates a system diagram for a freight management application. FIG. 10 illustrates a user interface 411 displaying emergency facility navigation directions. FIG. 11 illustrates a login screen for a navigation system for use within facilities. FIG. 12 illustrates a system diagram for a user interface 411 of a freight management application. FIG. 13 illustrates a flow diagram for a user interface 411 for an administrator for a navigation application. FIG. 14 illustrates a user interface 411 having a login page, admin page, and user page. FIG. 15 illustrates a diagram of a user interface 411 of a website for the navigation system. FIG. 16 illustrates permission levels 1600 that may be utilized by the present system 400 for controlling access to user content 1615, 1635, 1655 such as user data 430A, facility data 430B, navigation data 430C, emergency data 430D. It is understood that the various method steps associated with the methods of the present disclosure may be carried out as operations by the system 400 shown in FIG. 4.

Generally, the system 400 is designed to facilitate efficient and safe navigation within complex facilities, such as manufacturing or industrial plants, via a first computing device. The system 400 leverages multiple geographic information systems (GIS) and real-time data to provide personalized navigation guidance to users 405. The system 400 includes a first computing device with a user interface 411, GPS device 409, and second computing device 407, all interconnected and operatively communicating with each other. The system 400 is configured to provide navigation data 430C, such as navigation instructions, to a user 405 based on their proximity to the facility and their specific user data 430A. The system 400 dynamically adapts to the user's location within the facility and updates navigation instructions in real-time. In certain scenarios, the system 400 may generate emergency navigation instructions to guide users 405 safely away from emergency situations within the facility. The system's 400 ability to adapt to real-time conditions and user data 430A enhances the safety and efficiency of navigation within complex facilities.

The processor 220 is configured to perform the operations disclosed herein based on instructions stored within the system 400. The processor 220 may be any processor 220 or microprocessor suitable for executing instructions. In some embodiments, the processor 220 may have a memory device therein or coupled thereto suitable for storing the data, content 1615, 1635, 1655, or other information or material disclosed herein. In some instances, the processor 220 may be a component of a larger computing device 410. The processor 220 may process instructions for execution within computing devices 410, including instructions stored in memory or on a storage device, to display graphical information for a graphical user interface (GUI) on an external input/output device, such as a display 316. The processor 220 may provide for coordination of the other components of a computing device 410, such as control of user interfaces 411, applications run by a computing device 410, and wireless communication by a communication device of the computing device 410. A computing device 410 that may house the processor 220 therein may include, but are not limited to, laptops, desktops, workstations, personal digital assistants, servers 120, mainframes, cellular telephones, tablet computers, or any other similar device. Accordingly, the inventive subject matter disclosed herein, in full or in part, may be implemented or utilized in devices including, but are not limited to, laptops, desktops, workstations, personal digital assistants, servers 120, mainframes, cellular telephones, tablet computers, or any other similar device.

In a preferred embodiment, the programming instructions responsible for the operations carried out by the processor 220 are stored on a non-transitory computer-readable medium 416 ("CRM"), which may be coupled to the server 110, as shown in FIG. 4. Alternatively, the programming instructions may be stored or included within the processor 220. Examples of non-transitory computer-readable mediums 416 include, but are not limited to, magnetic media such as hard disks, floppy disks, and magnetic tape; optical media such as CD ROM discs and DVDs; magneto-optical media such as optical discs; and hardware devices that are specifically configured to store and perform programming instructions, such as read-only memory (ROM), random access memory (RAM), flash memory, and the like. In some embodiments, the programming instructions may be stored as modules within the non-transitory computer-readable medium 416. The software instructions may be read into memory from another non-transitory computer-readable medium 416 or from another device. Alternatively, hard-wired circuitry may be used in place of or in combination with software instructions to implement processes consistent with the principles of the invention. Thus, implementations consistent with the principles of the invention are not limited to any specific combination of hardware circuitry and software.

As mentioned previously, the computing device 410 may further comprise a user interface 411. A user interface 411 may be defined as a space where interactions between a user 405 and the system 400 may take place. In a preferred embodiment, the interactions may take place in a way such that a user 405 may control the operations of the system 400. A user interface 411 may include, but is not limited to operating systems, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. In some embodiments, the user interface 411 may be operably connected to back-end hardware, such as a server 110, and/or software that separately handles permission levels 1600 of the various users 405. The system 400 may present data of the user interface 411 to the user 405 via a display 316 operably connected to the processor 220. A display 316 may be defined as an output device that communicates data that may include, but is not limited to, visual, auditory, cutaneous, kinesthetic, olfactory, and gustatory, or any combination thereof.

Information presented via a display 316 may be referred to as a soft copy of the information because the information exists electronically and is presented for a temporary period of time. Information stored on the non-transitory computer-readable medium 416 may be referred to as the hard copy of the information. For instance, a display 316 may present a soft copy of visual information via a liquid crystal display (LCD), wherein the hardcopy of the visual information is stored on a local hard drive. For instance, a display 316 may present a soft copy of audio information via a speaker, wherein the hard copy of the audio information is stored on a flash drive. For instance, a display 316 may present a soft copy of tactile information via a vibration device within the computing device 410, wherein the hard copy of the tactile information is stored within a database 115. Displays 316 may include, but are not limited to, cathode ray tube monitors, LCD monitors, light emitting diode (LED) monitors, gas plasma monitors, screen readers, speech synthesizers, haptic suits, speakers, and scent generating devices, or any combination thereof.

In one preferred embodiment, the system 400 may be used to navigate users 405 to nearby storm shelters during extreme weather events, whether the shelters are located on-site or off-site. The system 400 may be configured to provide real-time alerts and navigation instructions tailored to the specific facility and user needs. For instance, in a school facility, the user interface 411 may be optimized to provide clear directions and instructions to teachers, guiding them and their students to designated on-site storm shelters. The system 400 may present a map highlighting the safest and quickest routes, ensuring that everyone reaches the shelter promptly and safely. Additionally, the system 400 may provide updates on weather conditions and any changes to the sheltering plan. For instance, in a smelting plant, the system 400 may be configured to guide workers to the nearest storm shelter, whether it is within the facility or at a nearby location. The user interface 411 may provide step-by-step navigation, taking into account the plant's layout and any potential hazards. The system 400 may also offer safety instructions specific to the plant's environment, such as avoiding certain areas or equipment during the storm. In both scenarios, the system 400 may dynamically update navigation instructions based on real-time weather data and user locations, ensuring that users 405 are directed to safety efficiently and enhancing the overall safety and preparedness of facilities during extreme weather events.

In another preferred embodiment, the system 400 may be used to navigate users 405 to nearby shelters or instruct users 405 on how to shelter in place during active shooter situations. For instance, the system 400 may be configured to send immediate alerts to individuals when an active shooter is detected on-site or nearby. The user interface 411, tailored for specific environments, may provide real-time navigation to safe zones or designated shelters within the facility. For instance, in an automobile manufacturing facility, the system 400 may send alerts to workers, informing them of an active shooting situation. It may then guide them to secure areas such as designated safe rooms or assembly points away from the threat. The system 400 may also provide instructions on how to barricade themselves in place if evacuation is not possible, ensuring that workers know how to protect themselves effectively. In a school setting, the system 400 may alert teachers and staff about an active shooter situation and provide step-by-step instructions on how to shelter in place, such as locking doors, turning off lights, and remaining silent. Additionally, the system 400 may facilitate communication with law enforcement, allowing teachers to receive updates and instructions directly from authorities, enhancing coordination and safety.

For instance, the system 400 may be configured to send alerts to passengers and staff located at airports and/or train stations when an active shooter is detected on-site or nearby. The user interface 411, optimized for such facilities, may provide real-time navigation to safe zones or designated shelters within the airport or train station. For instance, in an airport scenario, the system 400 may guide passengers away from the threat and towards secure areas such as emergency exits, designated safe rooms, or underground shelters. Additionally, the system 400 may facilitate communication with airport security and law enforcement, allowing users 405 to receive updates and instructions directly from authorities. Similarly, in a train station, the system 400 may direct users 405 to safe zones such as underground tunnels or secure waiting areas. In some preferred embodiments, the system 400 may be integrated with a facility's announcement system to ensure that all users 405 receive timely and accurate information. Accordingly, the system 400 may dynamically update information presented to a user 405, including instructions and navigation instructions, based on the user's location and the evolving situation, ensuring that users 405 are always directed away from danger. This capability enhances the safety and efficiency of emergency response efforts in complex and/or crowded environments.

In a preferred embodiment, the system 400 may be configured to navigate users 405 to the nearest emergency assistance unit, such as an Automated External Defibrillator (AED) device, first aid station, fire suppression system, or any combination thereof, depending on the type of emergency. This capability ensures that users 405 can quickly access critical resources during emergencies, enhancing safety and response efficiency. For instance, in a large office building, if a medical emergency occurs that requires immediate medical attention, the system 400 may guide users 405 to the nearest AED device or first aid station. The user interface 411 may provide clear, step-by-step directions, ensuring that help is reached as swiftly as possible. Additionally, the system 400 may offer instructions on how to use the AED or administer basic first aid, supporting users 405 who may be unfamiliar with these procedures. In an industrial facility, the system 400 may direct users 405 to the closest fire suppression system in the event of a fire. The user interface 411 may highlight the safest route, taking into account any obstacles or hazards. The system 400 may also provide instructions on how to operate the fire suppression equipment, ensuring that users 405 can respond effectively to contain the fire.

In some embodiments, the system 400 may choose to navigate the user 405 away from the emergency instead of directing them to an emergency assistance unit. This decision-making capability allows the system 400 to adapt to the specific nature of the emergency, prioritizing user safety above all else. For instance, if a hazardous chemical spill occurs, the system 400 may guide users 405 to a safe evacuation point, avoiding the affected area. The user interface 411 may provide real-time updates on the spill's location and spread, ensuring that users 405 take the safest route possible. In the event of a fire, the system 400 may direct users 405 away from smoke-filled areas and towards designated fire exits. It may also provide instructions on how to stay low to the ground to avoid smoke inhalation and how to use emergency staircases instead of elevators. During an earthquake, the system 400 may guide users 405 to structurally safe areas within the facility, such as under sturdy furniture or in doorways. It may also provide instructions on how to protect themselves from falling objects and debris. Overall, this feature enhances the system's 400 ability to respond to various emergency scenarios, providing users 405 with the guidance and resources they need to handle the situation effectively. By dynamically adapting to the nature of the emergency, the system 400 ensures that user safety is always the top priority.

In some preferred embodiments, the system 400 may further comprise at least one sensor configured to measure environmental data. In a preferred embodiment, environmental data measured by the system 400 may include, but is not limited to, temperature, sound, atmospheric pressure, visual or any combination thereof. The system 400 may then use this information to determine when emergency situations are taking place. For instance, at least one sensor in the form of a microphone and located at a train station may be configured to collect sound data that the system 400 may use to determine when a firearm is fired in the vicinity of said at least one sensor. In some preferred embodiments, the system 400 may be further configured to determine the type of firearm fired based on the sound data collected. In yet another preferred embodiment, the system 400 may be further configured to estimate a location of the fired firearm based on decibel level and firearm type as determined by the system 400. The system 400 may then use this information to better inform users 405 of the system 400, particularly those located at or near the relevant train station, about the active shooting situation as well as navigate users 405 away from the active shooting situation.

For instance, at least one sensor in the form of a barometer may collect barometric pressure data that the system 400 may use to determine when a dangerous storm cell is approaching. A sudden drop in barometric pressure may trigger the system 400 to alert users 405 of potential adverse weather conditions, such as severe thunderstorms or tornadoes. The system 400 may then direct users 405 to designated safe locations, such as storm shelters or secure indoor areas, ensuring their safety during the event. Additionally, the system 400 may integrate with local weather services to provide real-time updates and forecasts, enhancing its ability to predict and respond to weather changes. This integration allows the system 400 to offer timely and accurate guidance, minimizing the risk to users 405.

For instance, at least one sensor in the form of a thermometer may collect temperature data, which the system 400 may use to assess the risk of heat-related illnesses or hypothermia. When the temperature reaches a threshold that indicates a higher risk of heat stroke or hypothermia, the system 400 may send alerts to users 405, advising them on how to stay safe. For instance, during extreme heat, the system 400 may recommend staying hydrated, seeking shade, or taking breaks in air-conditioned areas. In cold conditions, it may advise users 405 to wear appropriate clothing, limit exposure, and seek warmth. These proactive measures help users 405 avoid situations that could be detrimental to their health. The system 400 may also be configured to provide personalized recommendations based on user data 430A, such as age, health conditions, or activity level, ensuring that the guidance is tailored to individual needs. This personalized approach enhances the system's 400 effectiveness in promoting user safety and well-being.

In a preferred embodiment, the system 400 may be configured to enhance the navigation of autonomous vehicles within complex facilities, such as industrial plants, airports, and distribution centers. By leveraging advanced technologies and real-time data, the system 400 may provide precise and adaptive navigation instructions to autonomous vehicles, ensuring efficient and safe vehicle operations. In a preferred embodiment, the system 400 is integrated into an autonomous vehicle's onboard systems, including sensors, cameras, and control units. This integration allows the system 400 to access real-time data from the vehicle, such as its current location, speed, and environmental conditions. By processing this data, the system 400 may provide tailored navigation instructions that align with the vehicle's capabilities and the facility's layout. Additionally, the system 400 may continuously update maps of the GIS to reflect any changes in the facility's layout, such as construction zones or temporary closures, ensuring that autonomous vehicles have access to the most accurate and up-to-date information. As such, the system 400 may enhance an autonomous vehicles ability to navigate efficiently and avoid obstacles.

In another preferred embodiment, the system 400 may be configured to employ dynamic route optimization to adapt to real-time conditions within the facility. By analyzing data such as traffic patterns, weather conditions, and operational schedules, the system 400 may identify the most efficient routes for autonomous vehicles, reducing travel time, minimizing energy consumption, and enhancing overall productivity. This capability may be particularly beneficial in environments with high vehicle density, where congestion may impact operational efficiency. To support dynamic route optimization, some preferred embodiments of the system 400 may integrate real-time data from various sources, including facility management systems, traffic sensors, and weather stations. This data may be processed using advanced algorithms to provide actionable insights for autonomous vehicles. For instance, if a section of the facility is temporarily closed due to unscheduled maintenance or an accident, the system 400 may reroute vehicles to avoid the affected area. Similarly, if adverse weather conditions are detected, the system 400 may adjust navigation instructions to ensure safe vehicle operations.

In yet another preferred embodiment, the system 400 may direct autonomous vehicles to safe zones or designated evacuation routes in emergency situations, ensuring they do not interfere with emergency response and/or evacuation efforts. For instance, if a fire breaks out in a part of the facility, the system 400 may reroute vehicles away from the affected area and guide them to a secure location. This capability enhances the safety of both the vehicles and facility personnel during emergencies. The system 400 may also be configured to facilitate communication between multiple autonomous vehicles operating within a facility. By coordinating their movements, the system 400 helps prevent congestion and collisions, enhancing overall traffic flow, which may be particularly useful in emergency situations. In a preferred embodiment, this may be achieved via a centralized communication platform that allows vehicles to share information about their location, speed, and intended routes. The system 400 may use this information to optimize vehicle movements and ensure smooth operations.

In another preferred embodiment, the system 400 may integrate with the facility's operational systems to support a wide range of logistical needs. For instance, in a distribution center, the system 400 may coordinate the movements of autonomous vehicles with the loading and unloading schedules, ensuring that autonomous vehicles arrive at the right location at the right time so that delays are minimized and operational efficiency is enhanced. Similarly, in an airport, the system 400 may manage the movements of autonomous vehicles used for baggage handling, ensuring timely and accurate delivery of luggage. The system 400 may also be configured to ensure that facility specific safety protocols and regulations are strictly applied to on-site autonomous vehicles operably connected thereto via instructions sent to the autonomous vehicle from the processor 220. For instance, the system 400 may enforce speed limits within the facility, preventing autonomous vehicles from exceeding safe operating speeds. It may also restrict access to certain areas based on the autonomous vehicle's clearance level, ensuring that only authorized autonomous vehicles enter restricted zones. These safety measures help prevent accidents and ensure compliance with facility policies.

As illustrated in FIG. 4, the second computing device 407 may be configured to send facility navigation instructions to the first computing device when the user 405 is within a threshold distance of the facility. In some preferred embodiments, the second computing device 407 may be a server located remotely from the first computing device. This server may be responsible for managing the system's data and operations, including user data 430A, facility data 430B, navigation data 430C, emergency data 430D. The server may communicate with the first computing device via a network, such as a local area network (LAN), wide area network (WAN), or internet. The processor 220 may be configured to perform various operations based on instructions stored on a non-transitory computer-readable medium 416. These operations may include, but are not limited to, receiving geospatial data from the GPS device 409, directing the user 405 to the facility via the first GIS based on a geolocation of the facility, receiving facility navigation instructions when the user 405 is within a threshold distance of the facility, and directing the user 405 to the entry location and final location of the facility using the second GIS and the facility navigation instructions. The processor 220 may also perform additional operations, such as updating the facility navigation instructions in real-time based on changes in the user's location within the facility. This feature may allow the system 400 to dynamically adapt to the user's movements within the facility and provide updated navigation guidance as needed, thereby enhancing the accuracy and reliability of the navigation process.

In some preferred embodiments, the system 400 may dynamically update the facility navigation instructions based on changes in the user's location within the facility or changes in the facility conditions. For instance, if a user 405 deviates from the predetermined path, the system 400 may generate new navigation instructions to guide the user 405 back to the path or to a new path leading to the final location. Similarly, if a part of the facility becomes inaccessible due to an emergency or other reasons, the system 400 may generate new navigation instructions to guide the user 405 around the inaccessible area. These updated navigation instructions may be presented on the user interface 411 in real-time, providing the user 405 with up-to-date guidance at all times.

In a preferred embodiment, as illustrated in FIG. 7, the user interface 411 of the system 400 may include a first Geographic Information System (GIS) and a second GIS. The first GIS may be designed to provide long-range navigation guidance to a user 405, directing the user 405 to an entry location of a facility when the user 405 is within a threshold distance of the facility. The threshold distance may be dynamically adjusted based on various factors, such as traffic conditions, time of day, or weather conditions. In some cases, the first GIS may utilize GPS data received from a GPS device 409 operably connected to the first computing device to determine the user's proximity to the facility and provide appropriate navigation instructions. Once the user 405 is within the threshold distance of the entry location, the first computing device may receive facility navigation instructions. These instructions may be transmitted to the first computing device by a second computing device 407 when the user 405 is within the threshold distance of the facility.

The second computing device 407 may analyze user data 430A to determine a final location within the facility. The user data 430A may include information such as user preferences, user history, user appointments, or user medical information. For instance, if the facility is an industrial plant and the user 405 is a delivery driver, the final location may be a loading/unloading zone within the plant. For instance, user preferences may include preferred routes or locations within the facility, preferred navigation settings, or preferred notification settings. User history may include past navigation routes, past locations visited, or past navigation behaviors. User appointments may include scheduled meetings, deliveries, or tasks within the facility. User medical information may include health conditions, disabilities, or medical needs that may affect the user's navigation within the facility. This user data 430A may be stored in a user profile 430 associated with each user's account on the system 400. The system 400 may analyze this user data 430A to generate personalized and optimized navigation instructions for each user 405, thereby enhancing the user's navigation experience within the facility.

Upon receiving the facility navigation instructions, the user interface 411 may open a second GIS. The second GIS may be designed to provide short-range navigation guidance within the facility. Using the second GIS and the facility navigation instructions, the system 400 may direct the user 405 to the entry location of the facility and subsequently to the final location within the facility. In some preferred embodiments, the system 400 may include a plant-specific safety message that is shown every time the app is opened. This safety message may provide important safety information or guidelines specific to the facility. The user 405 may be required to acknowledge the safety message by checking an "I accept" checkbox before they can proceed with using the app. This feature may ensure that all users 405 are aware of the safety protocols of the facility, thereby enhancing overall safety within the facility.

In some preferred embodiments, the first GIS and the second GIS of the user interface 411 may be different geographic information systems optimized for different types of navigation. The first GIS may be designed for long-range navigation, guiding the user 405 to the entry location of the facility when the user 405 is within a threshold distance of the facility. This GIS may utilize GPS data and geolocation information to provide accurate and efficient navigation guidance over large distances. The second GIS, on the other hand, may be designed for short-range navigation within the facility. This GIS may provide detailed, turn-by-turn directions to guide the user 405 to their final location within the facility. The use of two different GIS systems may allow the system 400 to provide optimized navigation guidance for different navigation scenarios, thereby enhancing the overall efficiency and accuracy of the navigation process. In some preferred embodiments, the user interface 411 may be configured to present a map of the facility with the entry location and final location highlighted within the second GIS. The map of the second GIS may provide a visual representation of the facility layout, including various points of interest, paths, and areas within the facility. The entry location and final location may be highlighted on the map to provide a clear visual indication of the user's navigation target and starting point. This feature may enhance the user's understanding of the facility layout and their navigation path, thereby improving the user's navigation experience within the facility.

In a preferred embodiment, the facility navigation instructions provided by the system 400 may include turn-by-turn directions within the facility. These directions may guide the user 405 along a predetermined path from the entry location to the final location within the facility. The turn-by-turn directions may be presented on the user interface 411 and may be updated in real-time based on the user's current location within the facility. In other preferred embodiments, the system 400 may also provide auditory directions to complement the visual directions presented on the user interface 411. This feature may enhance the user's understanding of the navigation instructions and may allow the user 405 to navigate within the facility without constantly looking at the user interface 411.

In some preferred embodiments, the second computing device 407 may also generate emergency facility navigation instructions in response to an emergency situation within the facility. These emergency navigation instructions may direct the user 405 to the closest point of evacuation within the facility. The second computing device 407 may determine the user's current location within the facility using the GPS data and generate the emergency navigation instructions based on this location. The emergency navigation instructions may be designed to guide the user 405 away from the emergency and towards the closest point of evacuation in the most efficient and safe manner possible. In some cases, the emergency navigation instructions may be dynamically updated in real-time based on the user's current location and the nature of the emergency. For instance, if a fire breaks out in a part of the facility, the second computing device 407 may generate emergency navigation instructions that direct the user 405 away from the fire. If the fire spreads or changes direction, the second computing device 407 may update the emergency navigation instructions accordingly to ensure that the user 405 is always directed away from the fire. This dynamic and adaptive emergency routing capability may significantly enhance worker safety during emergencies in industrial facilities.

In some preferred embodiments, the emergency navigation instructions may be dynamically updated in real-time based on the user's current location within the facility and the nature of the emergency. For instance, if a fire breaks out in a part of the facility, the system 400 may generate emergency navigation instructions that direct the user 405 away from the fire. The system 400 may also provide real-time updates on any changes to the evacuation route due to blocked pathways or new hazards. In other preferred embodiments, the user interface 411 may include a prominent emergency route button. This button may be visually noticeable and positioned high on the screen for easy access. In the event of an emergency, the user 405 may press this button to receive emergency navigation instructions. The system 400 may then guide the user 405 to the closest point of evacuation using the second GIS of the user interface 411. These dynamic and adaptive emergency routing capability may significantly enhance the safety and efficiency of navigation within complex facilities, particularly in emergency situations.

In other preferred embodiments, the user interface 411 may also include a speed limit enforcement feature. This feature may prevent the application from working if the user's vehicle is moving over a set speed limit within the facility. This speed limit may be determined by the facility and may vary depending on the specific area within the facility. This feature may encourage users 405 to adhere to the facility's speed limits, thereby enhancing safety within the facility. The system 400 may also provide real-time updates on any changes to the facility layout or emergency route due to blocked pathways or new hazards. These updates may be presented on the user interface 411 and may be accompanied by audible alerts or notifications to ensure that the user 405 is aware of the changes. This feature may enhance the adaptability of the system 400 to real-time conditions within the facility, thereby improving the accuracy and reliability of the navigation guidance provided by the system 400.

The compass icon of the user interface 411 may provide users 405 with a visual indication of their current orientation within the facility. This feature may be particularly useful in large or complex facilities where it may be difficult for users 405 to maintain a sense of direction. The selected location field may present the name or identifier of the location that the user 405 has currently selected for navigation. This feature may provide users 405 with a clear and constant reminder of their navigation target, thereby enhancing the user's understanding of the navigation guidance provided by the system 400.

Referring to FIG. 10, the user interface 411 of the system 400 may include a map view of the facility. The map view may be designed to provide real-time navigation guidance within the facility. In some preferred embodiments, the map view may display a detailed layout of the facility, including various points of interest, such as entry and exit points, loading/unloading zones, restricted areas, and emergency evacuation routes. The map view may also present the user's current location within the facility, as determined by the GPS device 409 operably connected to the first computing device. This feature may allow users 405 to visually track their progress within the facility and adjust their navigation as needed. As previously mentioned, the GIS of the user interface 411 may also display an emergency route. The emergency route may be a pre-determined path within the facility that guides users 405 to the closest point of evacuation in the event of an emergency. The emergency route may be visually distinct from other paths on the map, such as by using a different color or line style, to ensure that it is easily identifiable by users 405. In some preferred embodiments, the emergency route may also include turn-by-turn directions to guide the user 405 along the route. This feature may significantly enhance worker safety during emergencies in industrial facilities.

In some preferred embodiments, the user interface 411 may include a facility selection control. This control may allow users 405 to select the facility they wish to navigate within. The facility selection control may be designed to provide a list of facilities that the user 405 has approval to access and may be presented in various formats, such as a dropdown list, map view, or search bar. Users 405 can select their desired facility from this list to start the navigation process. In some preferred embodiments, the system 400 may automatically detect the user's proximity to a facility using GPS data and suggest the closest facility as the default selection. This feature may enhance the convenience and efficiency of the navigation process, particularly for users 405 who frequently visit the same facility.

As illustrated in FIG. 15, the user interface 411 of the system 400 may include an "Admin Page" or "User Page." Selection of the "Admin Page" or "User Page" may provide users 405 with options to login as a user 405 or an administrator. Each user type may have different access levels and functionalities within the system 400. For instance, administrators may have access to administrative tools for managing user accounts and reviewing tracking data, while users 405 may only have access to the navigation features of the system 400. In some preferred embodiments, a "Register" button may allow new users 405 to create a user profile 430 in the system 400. Upon selection of the "Register" button, users 405 may be redirected to a registration page where they can enter their user information and create a new account. The registration process may involve entering various user information, such as name, contact details, and vehicle information. In some cases, users 405 may also be required to agree to terms of service and privacy policy during the registration process.

As illustrated in FIG. 8, upon selection of one of the "Admin Page" or "User Page," users 405 may be presented with an initial welcome screen. This screen may display the logo of the system 400 and a welcome message to greet the user 405. In some preferred embodiments, the welcome screen may also provide users 405 with important information or updates about the system 400 or the facility. As illustrated in FIG. 11, login screens may include fields for entering a username and password. In some preferred embodiments, the login screen may also include options for different types of users 405, such as regular users 405, plant administrators, or freight users 405. Each user type may have different access levels and functionalities within the system 400. For instance, plant administrators may have access to administrative tools for managing user accounts and reviewing tracking data, while regular users 405 may only have access to the navigation features of the system 400.

The "Admin Page" may provide plant administrators with a comprehensive overview of user activity within the facility. This page may display key user information, such as the user company name, active users 405, and location(s). The admin page may also include navigation options for Home, User List, Current Map, and User Compliance. In some preferred embodiments, plant administrators may be able to check if user companies have fully paid subscriptions for the year. This feature may allow administrators to monitor the compliance status of various users 405 operating within the facility. In other preferred embodiments, the user interface 411 of the system 400 may present administrators with a user list view, add user form, and payment confirmation page, allowing administrators to manage the system 400. The user list view may display a table listing all registered users 405 within the facility, along with their active status and locations. This feature may allow administrators to monitor the compliance status of various users 405 operating within the facility. The add user form may provide a platform for administrators to add new users 405 to the system 400. The form may include various input fields for entering user information, such as name, contact details, and vehicle information. In some cases, the form may also include options for setting user permissions or assigning users 405 to specific locations within the facility. The payment confirmation page may provide a platform for administrators to manage user subscriptions and payments. This page may display a list of all registered users 405, along with their subscription status and any outstanding payments. Administrators may have the ability to update subscription statuses, process payments, or send payment reminders to users 405. This feature may enhance the financial management and control of user operations within the facility.

The "User Page" may provide individual company users 405 with a platform to manage their user accounts. This page may include sections for Home, Users 405, and Add/Remove Users 405. In some preferred embodiments, users 405 may be able to view their account status, update their user information, or manage their subscription settings. The user page may also include a "Change Company Logo" button, allowing users 405 to customize their user profile 430 with their company logo. This feature may enhance the personalization and user-friendliness of the user interface 411. The welcome screen of the "User Page" may include three main options for users 405: User Login, Freight Login, and Register. The User Login option may be designed for existing users 405 who have already registered and created an account in the system 400. Upon selecting this option, users 405 may be prompted to enter their username and password to access their account and the system's features. The Freight Login option may be specifically designed for commercial truck drivers or freight companies. This option may provide a separate login portal tailored to the needs of freight users 405. For instance, the Freight Login option may include additional features or functionalities related to freight navigation, such as tracking of freight vehicles, scheduling of loading/unloading times, or management of freight routes.

Once a user 405 has logged in or registered, they may be directed to a facility selection screen. This screen may display a list of facilities that the user 405 has approval to access. The list may be presented in various formats, such as a dropdown list, a map view, or a search bar. Users 405 can select their desired facility from this list to start the navigation process. In some preferred embodiments, the system 400 may automatically detect the user's proximity to a facility using GPS data and suggest the closest facility as the default selection. This feature may enhance the convenience and efficiency of the navigation process, particularly for users 405 who frequently visit the same facility. In other preferred embodiments, the system 400 may also provide users 405 with the ability to add or remove facilities from their list. This feature may be particularly useful for users 405 who frequently visit multiple facilities or for administrators who manage multiple facilities. Users 405 may also have the option to set a default facility that is automatically selected each time they open the application. In yet other preferred embodiments, the system 400 may also provide users 405 with real-time updates or notifications about their selected facility. For instance, the system 400 may notify users 405 about changes in facility operations, traffic conditions, or safety alerts. These updates may be presented on the user interface 411 via a display 316 or sent to the user's device as push notifications.

In some preferred embodiments, as illustrated in FIG. 5, the system 400 may present additional options to users 405 via the user interface 411, including a User Compliance Page, Support Page, and Account Page. The User Compliance Page may serve as a platform for administrators to monitor the compliance status of various user companies within the facility. In some preferred embodiments, the User Compliance Page may display a table listing all registered user companies, their active status, and their respective points of contact. The active status may indicate whether the user company has a fully paid subscription for the year. This feature may allow plant administrators to ensure that all non-facility personnel entering the facility are registered and have user profiles 430, thereby enhancing the overall safety and security within the facility. The Support Page may provide a centralized location for users 405 to access help and support resources. This page may present contact information, such as an email address and phone number. In some preferred embodiments, the Support Page may also include a Frequently Asked Questions (FAQ) section, troubleshooting guides, or links to online resources. This feature may facilitate quick resolution of user queries or issues, thereby improving the user experience and the overall effectiveness of the system 400.

The Account Page may provide tools for management of user profiles 430. This page may allow administrators to manage user profiles 430 associated with their particular facility. For instance, administrators may have the ability to reset passwords, add other administrators, or modify user permissions. In some preferred embodiments, the Account Page may also provide an option for administrators to change the various indicia displayed within the user interface 411. In other preferred embodiments, the user interface 411 of the system 400 may be customizable to suit the specific needs and preferences of different types of industrial facilities. For instance, a chemical plant may require a simplified interface with large buttons and high-contrast colors to be easily readable while wearing protective equipment. For instance, an oil refinery may prefer an interface optimized for night-time use with a dark mode and red-light filter. This flexibility in interface design may allow the system 400 to cater to a wide range of industrial environments, thereby increasing its applicability and utility.

In a preferred embodiment, as illustrated in FIG. 9, the Freight application of the user interface 411 is designed to facilitate efficient management of freight operations within industrial facilities. The user interface 411 of the Freight application includes a main dashboard and an account status interface. The main dashboard of the Freight application provides a comprehensive overview of freight operations within a facility. The dashboard preferably presents key freight company information, such as the company name, contact details, and type of freight handled. The dashboard also provides real-time updates on the account status of each freight company. Administrators may further have access to information such as the subscription status, number of active users 405, and any outstanding payments or issues, allowing administrators to monitor the compliance status of various freight companies operating within the facility. In some preferred embodiments, the dashboard may also provide analytics or reports based on the freight data, such as trends in freight volumes, peak operation times, or common issues, which may be used by administrators to optimize freight operations and improve safety protocols within the facility.

The account status interface of the Freight application may provide detailed information about the account status of each freight company. This interface may display a list of all registered freight companies, along with their respective account statuses. The account status may indicate whether the freight company has a fully paid subscription for the year, any outstanding payments, or any issues with the account. In some preferred embodiments, the account status interface may also provide options for administrators to manage the accounts of freight companies. For instance, administrators may have the ability to activate or deactivate accounts, reset passwords, or modify account permissions. This feature enhances the overall management and control of freight operations within the facility. In some preferred embodiments, the Freight application may also include additional features to enhance its functionality. For instance, the application may provide administrators with the ability to send notifications or alerts to all freight companies within the facility. This feature could be used to communicate important updates or information to all freight operators in real-time. In other preferred embodiments, the Freight application may also provide administrators with the ability to track and analyze freight data over time. This feature could be used to identify trends or patterns in freight operations, which could be used for optimizing facility operations and improving safety protocols.

As illustrated in FIG. 12, the Freight application may further include several screens that allow users 405 to interact with different aspects of the freight management process. In a preferred embodiment, the Freight application may provide a comprehensive overview of freight operations within a facility. It may display key freight company information, such as the company name, contact details, and type of freight handled. The dashboard may also provide real-time updates on the account status of each freight company. This includes information such as the subscription status, number of active users 405, and any outstanding payments or issues. This feature may allow administrators to monitor the compliance status of various freight companies operating within the facility. In some preferred embodiments, the dashboard may also provide analytics or reports based on the freight data, such as trends in freight volumes, peak operation times, or common issues. This information can be used by plant administrators to optimize freight operations and improve safety protocols within the facility.

In another preferred embodiment, the Freight application may be an account status interface. This interface may provide detailed information about the account status of each freight company. This interface may present a list of all registered freight companies, along with their respective account statuses. The account status may indicate whether the freight company has a fully paid subscription for the year, any outstanding payments, or any issues with the account. In some aspects, the account status interface may also provide options for administrators to manage the accounts of freight companies. For instance, administrators may have the ability to activate or deactivate accounts, reset passwords, or modify account permissions. This feature enhances the overall management and control of freight operations within the facility. The Freight application may further comprise additional features to enhance its functionality. For instance, the application may provide administrators with the ability to send notifications or alerts to all freight companies within the facility. This feature could be used to communicate important updates or information to all freight operators in real-time. In other aspects, the Freight application may also provide administrators with the ability to track and analyze freight data over time. This feature could be used to identify trends or patterns in freight operations, which could be used for optimizing facility operations and improving safety protocols.

In a preferred embodiment, as illustrated in FIG. 6, the user interface 411 may be designed to provide administrators with comprehensive tools for monitoring and managing user activity within industrial facilities. The interface includes a User List page, a Company User page, and a Current Map page. The User List page may display a table listing all registered users 405 within the facility, along with their active status and locations. This feature may allow administrators to ensure that all non-facility personnel entering the facility are registered and have user profiles 430, thereby enhancing the overall safety and security within the facility. The Company User page may provide a more detailed view of users 405 associated with a specific facility. This page may present a list of user profiles 430 and user data 430A associated with the user profiles 430. In some preferred embodiments, administrators may be able to search by user name to see dates and times of logins. This feature may provide administrators with valuable insights into user activity patterns, which could be used for optimizing facility operations and improving safety protocols. The Current Map page may present a real-time map of the facility. In some preferred embodiments, the map may be interactive, allowing administrators to view the current locations of all active users 405 within a facility. This feature may be particularly useful in emergency situations, where the system 400 and/or administrators need to quickly assess the locations of all personnel within the facility.

In some preferred embodiments, the system 400 may also include additional features to enhance the functionality of the user interface 411 for administrators. For instance, the system 400 may provide administrators with the ability to send notifications or alerts to all users 405 within a facility. For instance, this feature could be used to communicate important safety information or updates to all personnel in real-time. For instance, this feature may provide plant administrators with the ability to track and analyze user activity data over time. For instance, this feature could be used to identify trends or patterns in user activity, which could be used for optimizing facility operations and improving safety protocols. This feature could be used to communicate important safety information or updates to all personnel in real-time. In other preferred embodiments, the system 400 may provide plant administrators with the ability to set or modify user permissions. This feature could be used to control access to certain areas of the facility, thereby enhancing security and safety within the facility. In yet other preferred embodiments, the system 400 may provide plant administrators with the ability to track and analyze user activity data over time. This feature could be used to identify trends or patterns in user activity, which could be used for optimizing facility operations and improving safety protocols.

In a preferred embodiment, the various data of the system 400 may be stored in user profiles 430. A user profile 430 may be defined as a profile containing data about a particular user 405. A facility profile may be defined as a profile containing data about a particular facility. In a preferred embodiment, a user profile 430 is related to a particular user 405. A user 405 is preferably associated with a particular user profile 430 based on a username, and a facility is preferably associated with a facility profile. However, it is understood that a user 405 may be associated with a user profile 430 and a facility may be associated with a facility profile using a variety of methods without departing from the inventive subject matter herein. Types of data that may be stored within user profiles 430 and facility profiles of the system 400 include, but are not limited to, user data 430A, facility data 430B, navigation data 430C, emergency data 430D. One preferred embodiment of the system 400 may comprise a database 115 operably connected to the processor 220. The database 115 may be configured to store user data 430A, facility data 430B, navigation data 430C, emergency data 430D within said user profiles 430 and facility profiles. The database 115 may be a relational database such that the user data 430A, facility data 430B, navigation data 430C, emergency data 430D associated with each user profile 430 or facility profile within the plurality of user profiles 430 or the plurality of facility profiles may be stored, at least in part, in one or more tables. Alternatively, the database 115 may be an object database such that user data 430A, facility data 430B, navigation data 430C, emergency data 430D associated with each user profile 430 or facility profile within the plurality of user profiles 430 or the plurality of facility profiles may be stored, at least in part, as objects. In some instances, the database 115 may comprise a relational and/or object database and a server 110 dedicated solely to managing the user data 430A, facility data 430B, navigation data 430C, emergency data 430D in the manners disclosed herein. Alternatively, the user data 430A, facility data 430B, navigation data 430C, emergency data 430D may be stored on the non-transitory computer-readable medium 416.

As used herein, user data 430A may be defined as personal information of a user that helps the system 400 identify the user and/or their purpose for visiting a facility. As used herein, user data 430A may be defined as personal information of a user that helps the system 400 identify the user and/or their purpose for visiting a facility. Types of data that may be used by the system 400 as user data 430A includes, but is not limited to, a user's name, username, social security number, phone number, gender, age, job title, current job, employment history, education history, certifications, skills, preferences, interests, medical information, emergency contacts, vehicle information, company affiliation, security clearance level, biometric data, or any combination thereof. In some aspects, the user data 430A may also include historical data such as past visits to facilities, frequently visited locations within facilities, or typical routes taken. The system 400 may analyze this user data 430A to generate personalized navigation instructions, recommend relevant points of interest within a facility, or adjust access permissions based on the user's profile. In other aspects, the user data 430A may be regularly updated to reflect changes in the user's information or preferences, allowing the system 400 to provide increasingly tailored and relevant navigation guidance over time.

As used herein, facility data 430B is data related to a particular facility. Types of data that may be used by the system 400 as facility data 430B includes, but is not limited to, facility layout information, entry and exit points, restricted areas, loading/unloading zones, emergency evacuation routes, and facility-specific safety protocols. The facility data 430B may also include real-time information about facility conditions, such as temporary closures of certain areas, ongoing maintenance work, or changes in traffic patterns within the facility. In some aspects, the facility data 430B may be regularly updated to reflect any changes in the facility layout or operations. The system 400 may use this facility data 430B to generate accurate and up-to-date navigation instructions for users 405 within the facility. In some cases, the facility data 430B may also include information about different access levels or permissions for various areas within the facility, which the system 400 may use to customize navigation instructions based on a user's clearance level.

As used herein, emergency data may include, but is not limited to, information related to emergency situations within a facility, such as fire outbreaks, chemical spills, equipment malfunctions, security threats, or natural disasters. Emergency data may also encompass evacuation routes, locations of emergency equipment, contact information for emergency responders, and real-time updates on the status and location of an emergency situation. In some aspects, emergency data may include predefined emergency protocols and procedures specific to different types of emergencies or different areas within a facility. The system 400 may use this emergency data to generate and update emergency facility navigation instructions in real-time, ensuring that users 405 are guided safely away from danger and towards the nearest safe exit or assembly point. In other aspects, emergency data may also include information about the locations and status of personnel within the facility during an emergency, allowing for more effective coordination of evacuation and rescue efforts.

In a preferred embodiment, the system 400 may include security measures to protect user data 430A and ensure the integrity of the system 400. For instance, the system 400 may implement encryption technologies to secure the transmission of user data 430A between the first computing device and the second computing device 407. The system 400 may also include user authentication mechanisms, such as two-factor authentication or biometric authentication, to verify the identity of users 405 and prevent unauthorized access to the system 400. In other preferred embodiments, the system 400 may also include a password recovery feature to assist users 405 who have forgotten their password. This feature may involve sending a password reset link to the user's registered email address or asking the user to answer security questions to verify their identity. In some preferred embodiments, the system 400 may also include a user feedback feature for users 405 to provide feedback or report issues with the system 400. This feature may involve a feedback form or a reporting tool within the user interface 411. Users 405 can use this feature to report any issues they encounter while using the system 400, suggest improvements, or provide general feedback. The system 400 may also include a support feature for users 405 to access help resources or contact the support team for assistance. This feature may involve a support page within the user interface 411, a help button, or a contact form. These features may enhance the user experience and help the system developers to continuously improve the system 400 based on user feedback.

In a preferred embodiment, the system 400 may use artificial intelligence (AI) techniques to perform functions of the system 400. In one preferred embodiment, AI techniques may be used to manage navigation at a facility, redirecting users 405 as necessary to increase efficiency and/or lower risk of accident. In yet another preferred embodiment, AI techniques may be used to organize an emergency response by emergency responders. In yet another preferred embodiment, AI techniques may be used to direct users 405 to safe locations in emergency situations. In yet another preferred embodiment, AI techniques may be used to redirect users 405 out of the path of emergency responders responding to an emergency situation to give those emergency responders easier access to the emergency situation. The term "artificial intelligence" and grammatical equivalents thereof are used herein to mean an intelligence method used by the system 400 to correctly interpret and learn from data of the system 400 or a plurality of systems in order to achieve specific goals and tasks through flexible adaptation. Types of intelligence methods that may be used by the system 400 include, but are not limited to, machine learning, neural network, computer vision, or any combination thereof.

The system 400 preferably uses machine learning techniques to perform the methods disclosed herein, wherein the instructions carried out by the processor 220 for said machine learning techniques are stored on the non-transitory computer-readable medium 416, server 110, and/or database 115. Machine learning techniques that may be used by the system 400 include, but are not limited to, classification algorithms, neural network algorithm, regression algorithms, decision tree algorithms, clustering algorithms, genetic algorithms, supervised learning algorithms, semi-supervised learning algorithms, unsupervised learning algorithms, deep learning algorithms, or other types of algorithms. More specifically, machine learning algorithms can include implementations of one or more of the following algorithms: support vector machine, decision tree, nearest neighbor algorithm, random forest, ridge regression, Lasso algorithm, k-means clustering algorithm, boosting algorithm, spectral clustering algorithm, mean shift clustering algorithm, non-negative matrix factorization algorithm, elastic net algorithm, Bayesian classifier algorithm, RANSAC algorithm, orthogonal matching pursuit algorithm, bootstrap aggregating, temporal difference learning, backpropagation, online machine learning, Q-learning, stochastic gradient descent, least squares regression, logistic regression, ordinary least squares regression (OLSR), linear regression, stepwise regression, multivariate adaptive regression splines (MARS), locally estimated scatterplot smoothing (LOESS) ensemble methods, clustering algorithms, centroid based algorithms, principal component analysis (PCA), singular value decomposition, independent component analysis, k nearest neighbors (kNN), learning vector quantization (LVQ), self-organizing map (SOM), locally weighted learning (LWL), apriori algorithms, eclat algorithms, regularization algorithms, ridge regression, least absolute shrinkage and selection operator (LASSO), elastic net, classification and regression tree (CART), iterative dichotomiser 3 (ID3), C4.5 and C5.0, chi-squared automatic interaction detection (CHAID), decision stump, M5, conditional decision trees, least-angle regression (LARS), naive bayes, gaussian naïve bayes, multinomial naïve bayes, averaged one-dependence estimators (AODE), bayesian belief network (BBN), bayesian network (BN), k-medians, expectation maximisation (EM), hierarchical clustering, perceptron back-propagation, hopfield network, radial basis function network (RBFN), deep boltzmann machine (DBM), deep belief networks (DBN), convolutional neural network (CNN), stacked auto-encoders, principal component regression (PCR), partial least squares regression (PLSR), sammon mapping, multidimensional scaling (MDS), projection pursuit, linear discriminant analysis (LDA), mixture discriminant analysis (MDA), quadratic discriminant analysis (QDA), flexible discriminant analysis (FDA), bootstrapped aggregation (bagging), adaboost, stacked generalization (blending), gradient boosting machines (GBM), gradient boosted regression trees (GBRT), random forest, or even algorithms yet to be invented.

In a preferred embodiment, the system 400 may determine navigation routes within a facility for a user using a machine learning technique. For instance, the system 400 may obtain audio data from a user and process it using natural language processing (NLP) to determine if a user is lost. The NLP techniques may analyze the user's speech patterns, tone, and content to detect signs of confusion or disorientation. If the system 400 detects that a user may be lost, it may automatically offer navigation assistance or alert facility personnel. The system 400 may also use the processed audio data to improve its understanding of common navigation challenges within the facility, allowing for continuous refinement of its navigation algorithms. In some preferred embodiments, the system 400 may use machine learning techniques to create navigation instructions for multiple users 405 entering or exiting the facility simultaneously. For instance, the system 400 may analyze historical traffic flow data within the facility, by way of a semi-supervised learning, to identify optimal routes during peak times. The system 400 may also consider real-time factors such as the number of users 405 currently in different areas of the facility to dynamically adjust navigation instructions. Additionally, the system 400 may use predictive modeling to anticipate potential congestion points and proactively route users 405 to avoid these areas. In another preferred embodiment, the system 400 may create safety routes and emergency personnel routes designed to increase safety and response time. For example, the system 400 may create separate routes for emergency personnel and non-emergency personnel to minimize interference during emergency situations. The system 400 may also incorporate real-time data on facility conditions, such as temporary closures or maintenance work, to further optimize routing and enhance safety. To accomplish this, the system 400 may utilize machine learning algorithms to analyze historical data on emergency response times, traffic patterns, and facility layouts. The system 400 may continuously update its routing algorithms based on new data and feedback from emergency responders. For non-emergency personnel, the system 400 may prioritize routes that lead away from potential danger zones while avoiding congestion. For emergency personnel, the system 400 may calculate the fastest routes to the emergency site, taking into account factors such as vehicle type and current traffic conditions. The system 400 may also integrate with facility security systems to automatically update routes based on real-time events, such as fire alarms or security breaches. Additionally, the system 400 may include features for emergency coordinators to manually override or adjust routes as needed during evolving situations.

In a preferred embodiment, the system 400 may use more than one machine learning technique determine navigation routes within a facility for a user. For instance, a system 400 comprising a microphone may use a combination of NLP and reinforcement learning to determine to determine if a user is lost. If the system 400 determines that a user is lost within a facility, it may automatically offer navigation assistance or alert facility personnel. For instance, the system 400 comprising a camera may use a combination of facial emotion recognition (FER) and deep learning to discern how attentive a user 405 is while navigating a facility within a vehicle. In another preferred embodiment, the system 400 comprises a proximity sensor or camera to determine the location of a user within a facility and/or their driving behavior. The system 400 may then use these data in conjunction with machine learning techniques to assess a user's behavior relative their location. For instance, the machine learning techniques may determine that a user who has disregarded recommended navigation instructions is acting suspicious based on driving behavior, facial expressions, and location within a facility.

In a preferred embodiment, the system 400 can utilize machine learning techniques to determine developing emergency situations at a facility and inform users 405 of said developing emergency situation. These insights may be applied for safety purposes. For instance, the system 400 can process environmental data to detect potential hazards or emergency situations. For example, audio sensors could identify sounds associated with distress or danger, while visual sensors could detect suspicious behavior or safety risks. For instance, the system 400 may alert users 405 of a developing emergency situation upon the auditory detection of gunfire from the microphone of one or more sensors or nearby computing devices 410. The system 400 could then navigate users 405 to the nearest safe area as well as alert emergency personnel of the potential shooting. In some preferred embodiments, the system 400 may instruct users 405 differently during an emergency situation, depending on user data 430A, permissions, geospatial data, etc. For instance, the system 400 may direct standard personnel to a safe room or exit during an emergency situation but direct security personnel towards the emergency situation.

In a preferred embodiment, the system 400 may be used for military applications, particularly in coordinating vehicle entry and/or exit at a military group or site like a fort, camp, or naval vessel. The system 400 can be adapted to meet the unique needs of military operations, providing secure and efficient communication and personnel management. By leveraging artificial intelligence (AI) techniques, the system 400 can enhance the coordination and management of vehicle movements, ensuring that operations are conducted smoothly and securely. For example, machine learning techniques can be used to analyze real-time data from various sensors and sources to manage the flow of vehicles entering and exiting a military site. At a fort or camp, the system 400 can integrate data from RFID tags, license plate recognition cameras, and other sensors to monitor and control vehicle access. AI algorithms can process this data to verify the identity of vehicles and drivers, ensuring that only authorized personnel are granted access. This capability enhances the security of the military site and prevents unauthorized access.

In addition, the system 400 can use machine learning techniques to optimize the scheduling and routing of vehicles within the military site. By analyzing data on vehicle movements, traffic patterns, and operational schedules, the system 400 can provide real-time recommendations for optimal routes and schedules. For example, the system 400 can direct supply trucks to the most efficient routes to avoid congestion and ensure timely delivery of supplies. This capability enhances the efficiency of logistics operations and reduces the risk of delays. Machine learning techniques can also be used to manage the allocation of parking spaces within the military site. The system 400 can analyze data on vehicle occupancy and availability of parking spaces to optimize the allocation of parking resources. For example, the system 400 can direct vehicles to available parking spaces based on their proximity to operational areas, ensuring that personnel have convenient access to their vehicles. This capability enhances the efficiency of parking management and reduces the risk of congestion.

Furthermore, the system 400 can use machine learning techniques to enhance communication and coordination among military personnel involved in vehicle operations. By analyzing data from communication networks, the system 400 can identify the most efficient communication channels and optimize the flow of information. For example, the system 400 can provide real-time updates on vehicle movements and traffic conditions to commanders and personnel, enhancing decision-making and coordination during operations. In a naval vessel, the system 400 can use machine learning techniques to manage the coordination of vehicle movements during embarkation and disembarkation operations. By analyzing data on vehicle movements, cargo loads, and operational schedules, the system 400 can provide real-time recommendations for optimal loading and unloading sequences. This capability ensures that vehicles and cargo are efficiently and safely transferred between the vessel and the shore, enhancing the overall efficiency of naval operations. Additionally, the system 400 can use machine learning techniques to support the maintenance and management of vehicles within the military site. By analyzing data on vehicle usage, performance, and maintenance history, the system 400 can predict future maintenance needs and optimize maintenance schedules. For example, the system 400 can identify vehicles that are due for maintenance and schedule them for servicing at the most convenient times, ensuring that vehicles are always in optimal condition and ready for use.

In a preferred embodiment, the machine learning techniques comprise instructions configured to create trained machine learning techniques from at least some training data and according to an implementation of the machine learning techniques, wherein the training data serves as a baseline dataset that may act as the foundational data of the machine learning techniques. The instructions of the machine learning techniques dictate how the machine learning techniques gain knowledge from the various data sources of the system 400 and may comprise various types of programable instructions that include, but are not limited to, local commands, remote commands, executable files, protocol commands, selected commands, or any combination thereof. The instructions of the machine learning techniques may vary widely, depending on a desired implementation. In a preferred embodiment, instructions may include streamed-lined instructions that instruct the machine learning techniques on how to train the system 400, possibly in the form of a script (e.g., Python, Ruby, JavaScript, etc.). In another preferred embodiment, the instructions may include data filters or data selection criteria that define requirements for desired results sets created from the various data of the system 400 as well as which machine learning algorithm is to be used.

Training of the machine learning techniques may be supervised, semi-supervised, or unsupervised. In some preferred embodiments, the machine learning techniques of the system 400 may use NLP to analyze data (e.g., audio data, text data, etc.). For instance, the system 400 may use geospatial data from a plurality of user's computing devices to determine preferred entrances and/or exits of a facility. This user data 430A may be used to train the machine learning technique as to how to better navigate users 405 of the system 400 about a facility. Training of the machine learning techniques may result in baseline machine learning techniques that may serve as AI techniques for performing the various functions of the system 400 in the manners described herein. Baseline machine learning techniques may further be configured to act as passive models or active models. A passive model may be described as a final, completed machine learning model that uses only the baseline data set to establish behavior of the baseline machine learning technique. An active model may be described as a plasticity machine learning model that is dynamic in that it may be updated using both the baseline dataset and data outside of the baseline data set.

In a preferred embodiment, the system 400 may use a passive model to allow for a high degree of control as to how the system 400 manages navigation and emergencies. For instance, a passive model may be configured via a private dataset to provide each user of the system 400 with the same navigation directions and emergency protocols. These navigation directions and emergency protocols may be presented by the system 400 regardless of user data 430A that may indicate that particular users 405 have historically preferred alternative navigation directions or emergency protocols. A passive model may be especially useful for users 405 having user profiles 430 with little user data 430A from which the machine learning techniques may learn from. In some preferred embodiments, the system 400 may be configured to begin as passive models until a threshold amount of user data 430A has been acquired. Once the threshold amount of user data 430A has been acquired, the system 400 may cause the machine learning techniques to switch to active models, allowing the system 400 to make recommendations to a user that better parallel historical preferences of the user. For instance, a system 400 may be configured to present certain navigation directions to a user via a passive machine model until at least one month worth of user data 430A pertaining to geospatial data of a plurality of users 405 has been collected. Once the preset amount of geospatial data has been collected, the machine learning techniques of the system 400 may switch to an active machine model that may present alternative navigation directions as determined by the active machine model.

In some embodiments, an active machine model may be updated in real-time, daily, weekly, bimonthly, monthly, quarterly, or annually using the various data (e.g., to update model instructions, shifts in time, new/corrected private data sets, user data 430A, advertisement data, etc.), of the system 400. In some preferred embodiments, the passive machine model may also be updated as new/updated private data sets become available. In a preferred embodiment, machine learning techniques comprise metadata that describe the state of the passive/active model with respect to its updates. The metadata may include attributes describing one or more of the following: a version number, date updated, amount of new data used for the update, shifts in model parameters, convergence requirements, or other information. Because each user of the system 400 may potentially have a unique machine learning technique associated with their user profile 430 due to the personal nature of user data 430A associated with each user profile, such information allows for identifying distinct passive/active models within the system 400 that may be separately managed.

In one preferred embodiment, to prevent un-authorized users 405 from accessing other user's information, the system 400 may employ a security method. As illustrated in FIG. 16, the security method of the system 400 may comprise a plurality of permission levels 1600 that may grant users 405 access to user content 1615, 1635, 1655 within the database 115 while simultaneously denying users 405 without appropriate permission levels 1600 the ability to view user content 1615, 1635, 1655. To access the user content 1615, 1635, 1655 stored within the database 115, users 405 may be required to make a request via a user interface 411. Access to the data within the database 115 may be granted or denied by the processor 220 based on verification of a requesting user's 1605, 1625, 1645 permission level 1600. If the requesting user's 1605, 1625, 1645 permission level 1600 is sufficient, the processor 220 may provide the requesting user 1605, 1625, 1645 access to user content 1615, 1635, 1655 stored within the database 115. Conversely, if the requesting user's 1605, 1625, 1645 permission level 1600 is insufficient, the processor 220 may deny the requesting user 1605, 1625, 1645 access to user content 1615, 1635, 1655 stored within the database 115. In an embodiment, permission levels 1600 may be based on user roles 1610, 1630, 1650 and administrator roles 1070, as illustrated in FIG. 16. User roles 1610, 1630, 1650 allow requesting users 1605, 1625, 1645 to access user content 1615, 1635, 1655 that a user 405 has uploaded and/or otherwise obtained through use of the system 400. Administrator roles 1070 allow administrators 1065 to access system 400 wide data.

In an embodiment, user roles 1610, 1630, 1650 may be assigned to a user in a way such that a requesting user 1605, 1625, 1645 may view user profiles 430 containing user data 430A, facility data 430B, navigation data 430C, emergency data 430D via a user interface 411. To access the data within the database 115, a user 405 may make a user request via the user interface 411 to the processor 220. In an embodiment, the processor 220 may grant or deny the request based on the permission level 1600 associated with the requesting user 1605, 1625, 1645. Only users 405 having appropriate user roles 1610, 1630, 1650 or administrator roles 1070 may access the data within the user profiles 430. For instance, as illustrated in FIG. 16, requesting user 1 1605 has permission to view user 1 content 1615 and user 2 content 1635 whereas requesting user 2 1625 only has permission to view user 2 content 1635. Alternatively, user content 1615, 1635, 1655 may be restricted in a way such that a user may only view a limited amount of user content 1615, 1635, 1655. For instance, requesting user 3 1645 may be granted a permission level 1600 that only allows them to view user 3 content 1655 related to their specific healthcare records but not user 3 content 1655 related to other their healthcare records. In the example illustrated in FIG. 16, an administrator 1065 may bestow a new permission level 1600 on users 405 so that it may grant them greater permissions or lesser permissions. For instance, an administrator 1065 may bestow a greater permission level 1600 on other users 405 so that they may view user 3's content 1655 and/or any other user's 405 content 1615, 1635, 1655. Therefore, the permission levels 1600 of the system 400 may be assigned to users 405 in various ways without departing from the inventive subject matter described herein.

In a preferred embodiment, the system 400 may be equipped to communicate in multiple languages, enhancing accessibility and usability for a diverse range of users 405. This multilingual capability may be integrated into the user interface 411, allowing users 405 to select their preferred language for receiving navigation instructions, alerts, and safety information. For instance, in an international airport, the system 400 may automatically detect a user's language preference based on their device settings or allow them to manually select a language. This ensures that passengers from different linguistic backgrounds receive clear and understandable guidance, whether navigating to gates, locating amenities, or responding to emergency situations. For instance, at a manufacturing facility with a multilingual workforce, the system 400 may provide instructions and alerts in the native languages of the employees. This feature may be crucial during emergencies, ensuring that all workers understand safety protocols and evacuation routes without language barriers. The system's 400 ability to communicate in multiple languages may also extend to auditory instructions, where voice prompts are available in various languages. This feature enhances the inclusivity and effectiveness of the system 400, ensuring that language differences do not impede user safety and navigation efficiency.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one peripheral device.

These computer programs, which may also be referred to as programs, software, applications, software applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display device, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, devices, and arrangements of the parts and method stages which have been described and illustrated in order to explain the nature of this inventive subject matter can be made without departing from the principles and scope of the inventive subject matter.

The invention claimed is:

1. A navigation system comprising:

a first computing device having a user interface and configured to provide navigation to a user within a facility, wherein said first computing device receives an entry location for said facility when a user is within a threshold distance of said facility, wherein a first GIS of said user interface directs said user to said entry location of said facility, wherein said first computing device receives facility navigation instructions when said user is within a threshold distance of said entry location, wherein said facility navigation instructions comprise a final location that is determined based on user data, wherein a second GIS of said user interface directs said user to said final location, a GPS device operably connected to said first computing device, wherein said GPS device is configured to receive geospatial data pertaining to a location of said first computing device, a second computing device operably connected to said first computing device, wherein said second computing device is configured to send said facility navigation instructions to said first computing device when said user is within said threshold distance of said facility, wherein said second computing device analyzes said user data to determine said final location, a processor operably connected to said first computing device, second computing device, and GPS device, a non-transitory computer-readable medium coupled to said processor, wherein said non-transitory computer-readable medium contains instructions stored thereon, which, when executed by said processor, cause said processor to perform operations comprising:

receiving geospatial data from said GPS device, directing said user to said facility via said first GIS based on a geolocation of said facility, receiving said facility navigation instructions when said user is within said threshold distance of said facility, wherein said facility navigation instructions are transmitted to said first computing device by said second computing device when said user is within said threshold distance of said facility as determined using said geolocation of said facility and said geospatial data of said GPS device, wherein said facility navigation instructions are generated by said second computing device based on said user data, opening said second GIS of said user interface when said facility navigation instructions are received, directing said user to said entry location of said facility using said second GIS and said facility navigation instructions, directing said user to said final location of said facility using said second GIS and said facility navigation instructions.

2. The navigation system of claim 1, wherein said user data comprises at least one of user preferences, user history, user appointments, or user medical information.

3. The navigation system of claim 1, wherein said facility is an industrial plant and said final location is a loading/unloading zone of said industrial plant.

4. The navigation system of claim 1, wherein said second computing device is a server located remotely from said first computing device.

5. The navigation system of claim 1, wherein said first GIS and said second GIS are different geographic information systems optimized for long-range navigation and short-range navigation, respectively.

6. The navigation system of claim 1, wherein said threshold distance is dynamically adjusted based on factors including at least one of traffic conditions, time of day, or weather conditions.

7. The navigation system of claim 1, wherein said facility navigation instructions include turn-by-turn directions within said facility.

8. The navigation system of claim 1, further comprising additional instructions stored on said non-transitory computer-readable medium, which, when executed by said processor, cause said processor to perform additional operations comprising:

updating said facility navigation instructions in real-time based on changes in said user's location within said facility.

9. The navigation system of claim 1, wherein said user interface is configured to display a map of said facility with said entry location and final location highlighted.

10. The navigation system of claim 1, wherein said second computing device creates emergency facility navigation instructions based on an emergency, wherein said emergency facility navigation instructions direct a user away from said emergency.

11. The navigation system of claim 10, further comprising additional instructions stored on said non-transitory computer-readable medium, which, when executed by said processor, cause said processor to perform additional operations comprising:

receiving emergency facility navigation instructions when an emergency has developed at said facility, wherein said second computing device determines when said emergency has occurred at said facility, wherein said second computing device generates said emergency facility navigation instructions when said emergency is determined, wherein said emergency facility navigation instructions direct said user away from said emergency.

12. A method for providing navigation within a facility, comprising:

receiving, by a first computing device, an entry location for said facility when a user is within a threshold distance of said facility;

directing, via a first geographic information system (GIS) of a user interface of said first computing device, said user to said entry location of said facility;

receiving, by said first computing device, facility navigation instructions when said user is within a threshold distance of said entry location, wherein said facility navigation instructions comprise a final location determined based on user data;

directing, via a second GIS of said user interface, said user to said final location;

receiving, by a GPS device operably connected to said first computing device, geospatial data pertaining to a location of said first computing device;

sending, by a second computing device operably connected to said first computing device, said facility navigation instructions to said first computing device when said user is within said threshold distance of said facility;

analyzing, by said second computing device, said user data to determine said final location;

receiving, by a processor operably connected to said first computing device, second computing device, and GPS device, said geospatial data from said GPS device;

directing, by said processor, said user to said facility via said first GIS based on a geolocation of said facility;

receiving, by said processor, said facility navigation instructions when said user is within said threshold distance of said facility;

opening, by said processor, said second GIS of said user interface when said facility navigation instructions are received;

directing, by said processor, said user to said entry location of said facility using said second GIS and said facility navigation instructions; and directing, by said processor, said user to said final location of said facility using said second GIS and said facility navigation instructions.

13. The method of claim 12, wherein said user data comprises at least one of user preferences, user history, user appointments, or user medical information.

14. The method of claim 12, wherein said facility is an industrial plant and said final location is a loading/unloading zone of said industrial plant.

15. The method of claim 12, wherein said first GIS and said second GIS are different geographic information systems optimized for long-range navigation and short-range navigation, respectively.

16. The method of claim 12, further comprising:

updating said facility navigation instructions in real-time based on changes in said user's location within said facility.

17. The method of claim 12, further comprising:

creating, by said second computing device, emergency facility navigation instructions based on an emergency, wherein said emergency facility navigation instructions direct said user away from said emergency.

18. The method of claim 17, further comprising:

receiving emergency facility navigation instructions when an emergency has developed at said facility;

determining, by said second computing device, when said emergency has occurred at said facility;

generating, by said second computing device, said emergency facility navigation instructions when said emergency is determined; and directing said user away from said emergency using said emergency facility navigation instructions.

19. A system for providing adaptive navigation within a facility, comprising:

a first computing device having a user interface;

a GPS device operably connected to said first computing device;

a second computing device operably connected to said first computing device;

a processor operably connected to said first computing device, second computing device, and GPS device;

a non-transitory computer-readable medium coupled to said processor, wherein said non-transitory computer-readable medium contains instructions stored thereon, which, when executed by said processor, cause said processor to perform operations comprising:

receiving geospatial data from said GPS device;

directing a user to said facility via a first geographic information system (GIS) of said user interface based on a geolocation of said facility;

receiving facility navigation instructions when said user is within a threshold distance of said facility, wherein said facility navigation instructions are transmitted to said first computing device by said second computing device;

opening a second GIS of said user interface when said facility navigation instructions are received;

directing said user to an entry location of said facility using said second GIS and said facility navigation instructions;

receiving emergency user data;

transmitting said emergency user data to said second computing device;

receiving emergency facility navigation instructions from said second computing device based on said emergency user data; and directing said user to a new final location within said facility using said second GIS and said emergency facility navigation instructions.

20. The system of claim 19, further comprising:

creating, by said second computing device, emergency facility navigation instructions based on an emergency, wherein said emergency facility navigation instructions direct said user away from said emergency;

receiving emergency facility navigation instructions when an emergency has developed at said facility;

determining, by said second computing device, when said emergency has occurred at said facility;

generating, by said second computing device, said emergency facility navigation instructions when said emergency is determined; and directing said user away from said emergency using said emergency facility navigation instructions.

* * * * *